(12) United States Patent  
Kaye

(10) Patent No.: US 6,686,926 B1
(45) Date of Patent: Feb. 3, 2004

(54) IMAGE PROCESSING SYSTEM AND METHOD FOR CONVERTING TWO-DIMENSIONAL IMAGES INTO THREE-DIMENSIONAL IMAGES

(75) Inventor: Michael C. Kaye, Agoura Hills, CA (US)

(73) Assignee: In-Three, Inc., Agoura Hills, CA (US)

( * ) Notice: Subject to any disclaimer, the term of this patent is extended or adjusted under 35 U.S.C. 154(b) by 134 days.

(21) Appl. No.: 09/819,420

(22) Filed: Mar. 26, 2001

Related U.S. Application Data

(63) Continuation-in-part of application No. 09/085,746, filed on May 27, 1998, now Pat. No. 6,208,348.

(51) Int. Cl.[7] .............................................. G06T 15/00
(52) U.S. Cl. ..................................................... 345/680
(58) Field of Search ................................ 345/419, 420, 345/619, 629, 427, 647, 672, 680, 676

(56) References Cited

U.S. PATENT DOCUMENTS

| | | | |
|---|---|---|---|
| 3,621,127 A | 11/1971 | Hope | 345/419 |
| 3,737,567 A | 6/1973 | Kratomi | 345/419 |
| 3,851,955 A | 12/1974 | Kent et al. | 364/200 |
| 4,017,166 A | 4/1977 | Kent et al. | 364/900 |
| 4,021,846 A | 5/1977 | Roese | 345/418 |
| 4,168,885 A | 9/1979 | Kent et al. | 352/129 |
| 4,183,633 A | 1/1980 | Kent et al. | 352/129 |
| 4,235,503 A | 11/1980 | Condon | 350/1.2 |
| 4,436,369 A | 3/1984 | Bukowski | 999/130 |
| 4,544,247 A | 10/1985 | Ohno | 352/62 |
| 4,603,952 A | 8/1986 | Sybenga | 352/65 |
| 4,819,064 A * | 4/1989 | Diner | 348/47 |
| 5,002,387 A | 3/1991 | Baljet et al. | 352/63 |
| 5,402,191 A | 3/1995 | Dean et al. | 352/63 |
| 5,481,321 A | 1/1996 | Lipton | 352/57 |
| 5,699,444 A | 12/1997 | Palm | 382/106 |
| 5,742,291 A | 4/1998 | Palm | 395/120 |
| 5,748,199 A | 5/1998 | Palm | 345/473 |
| 5,929,859 A | 7/1999 | Meijers | 345/419 |
| 5,973,700 A | 10/1999 | Taylor et al. | 345/427 |
| 6,031,564 A | 2/2000 | Ma et al. | 348/43 |
| 6,088,006 A | 7/2000 | Tabata | 345/7 |
| 6,091,421 A | 7/2000 | Terrasson | 345/419 |
| 6,166,744 A * | 12/2000 | Jaszlics et al. | 345/629 |

FOREIGN PATENT DOCUMENTS

| | | |
|---|---|---|
| WO | WO 97/24000 | 12/1996 |
| WO | WO 99/12127 | 3/1999 |

OTHER PUBLICATIONS

Kaufman, D., "The Big Picture", Apr. 1998, http://www.xenotech.com (downloaded Sep. 8, 1998).

* cited by examiner

Primary Examiner—Phu K. Nguyen
(74) Attorney, Agent, or Firm—Henricks, Slavin & Holmes LLP

(57) ABSTRACT

An image processing system and method for converting two-dimensional images into three-dimensional images is embodied in a workstation with multiple interactive user interfaces configured to facilitate implementation of a variety of image processing techniques. By employing these tools and methodologies, an operator can rapidly render great numbers of objects in digitized images and observe the results in real time as algorithms pertaining to the object are adjusted.

27 Claims, 34 Drawing Sheets

312 314 316 318

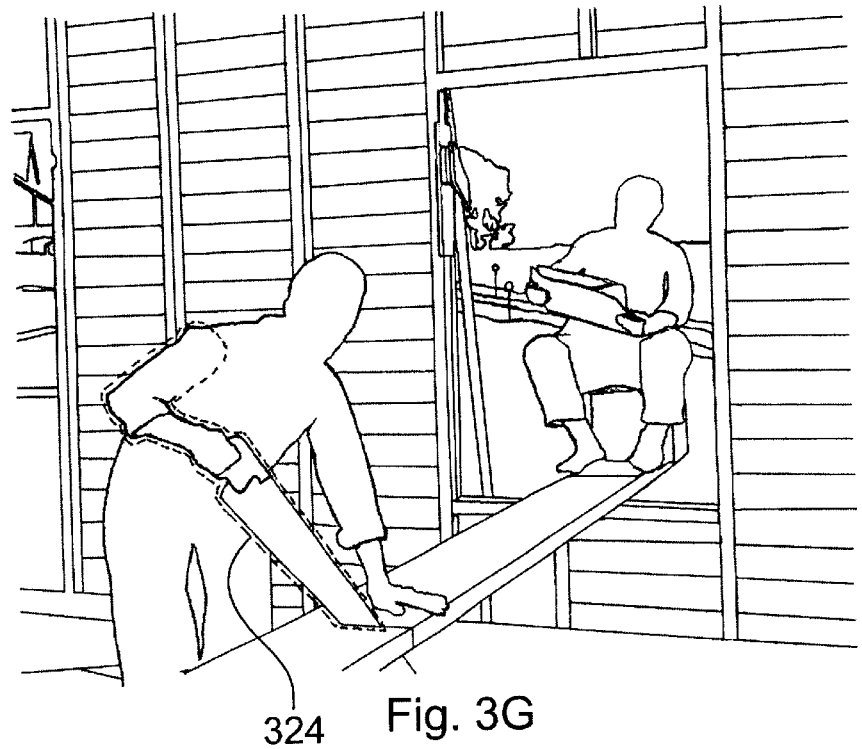
324  Fig. 3G
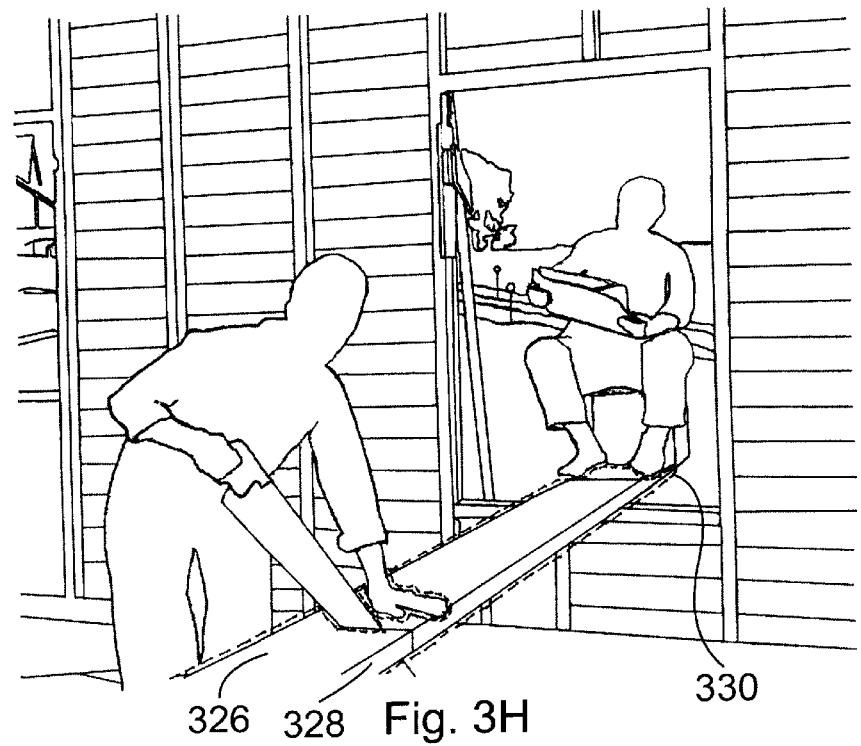
326  328  Fig. 3H  330

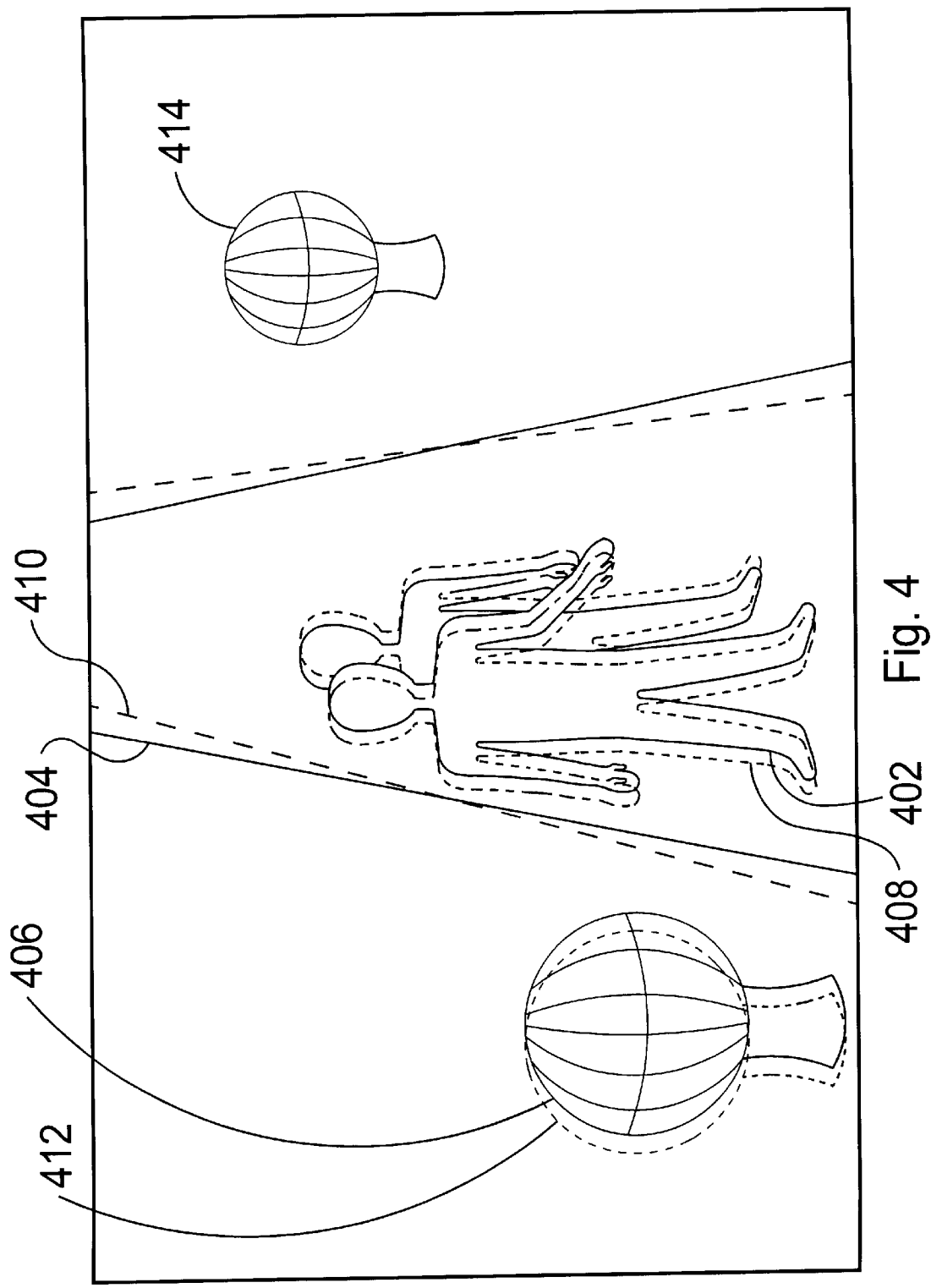

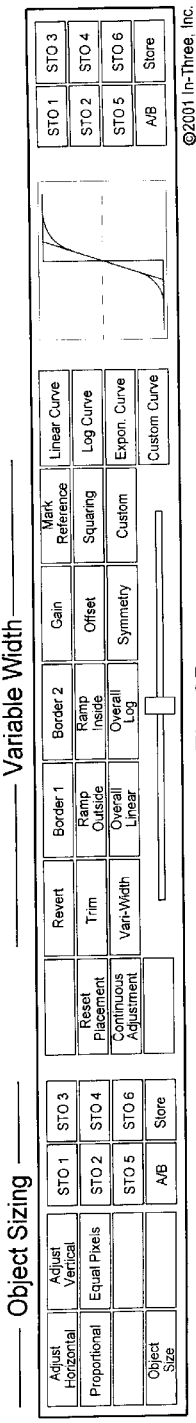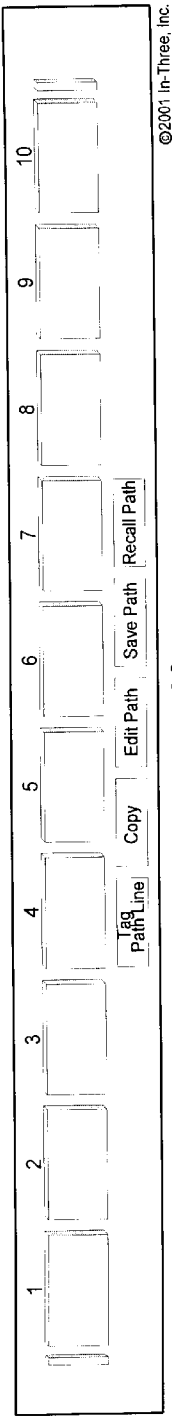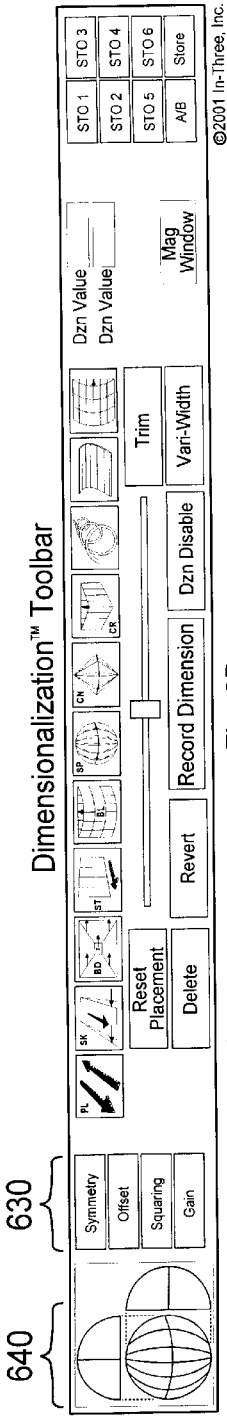
Fig. 6B
Fig. 6C
Fig. 6D

POSITION

SKEW

BEND

STRETCH

SPHERICAL BULGE

STRAIGHT BULGE

CONE BULGE

CORNER PUSH

TUNNEL EFFECT

SEMI-SPHERE

SPIRAL

WAVE

WAVE

WAVE

IMAGE PROCESSING SYSTEM AND METHOD FOR CONVERTING TWO-DIMENSIONAL IMAGES INTO THREE-DIMENSIONAL IMAGES

CROSS-REFERENCE TO RELATED APPLICATIONS

This application is a continuation-in-part of U.S. patent application Ser. No. 09/085,746 entitled "System and Method for Converting Two-Dimensional Images Into Three-Dimensional Images" filed on May 27, 1998, now U.S. Pat. No. 6,208,348 which is incorporated herein in its entirety.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to a system and method for processing two-dimensional images and, more particularly, pertains to a system and method for converting two-dimensional images into three-dimensional images.

2. Description of the Related Art

While three-dimensional photography and software for manipulating images are known, the art of image projection is devoid of a system and method which is particularly adapted to converting two-dimensional images into a format suitable for three-dimensional projection and which provides user-friendly, interactive interfaces which allow for rapid selection of objects within images and efficient application of object rendering functions to the selected objects for the purpose of creating a stereo pair of left and right images for three-dimensional projection.

SUMMARY OF THE INVENTION

Three Dimensional Imaging

The term 3D is now a commonly used term adopted by the computer graphics world, which actually refers to computer generated images that show height, width, and depth viewed in two dimensions. Prior to the advent of 3D graphics, the term 3D suggested the viewing of images whereby depth is perceived. To avoid confusion, the term 3D in this patent application refers to the reproduction of moving images in such a way that depth is perceived and experienced by the viewer.

There are two very fundamental types of 3D images, stereoscopic and auto-stereoscopic. The term stereoscopic imaging refers to each eye being presented with an image both from one fixed related angle of view. Each image, although very similar, is from a different horizontal angle of view of only 2.5 to 3 inches. This is merely a recreation of the two images presented to our brain for depth perception in the real world. If an image is viewed with only one eye, or if both eyes receive the same information, the brain loses its ability to perceive depth.

When viewing television, movies, photographs, or even a painting on the wall, both eyes see the same information and the experience of reality is lessened as depth and dimension have to be imagined.

Auto-stereoscopic refers to images presented to each eye with one major difference; there is no fixed angle of view. As you move from left to right of the image, the perspective changes. One sees a different angle of view, which will be referred to as the "look around effect". This is the same effect as when viewing a hologram, although holographic technology at present has far greater unusable restrictions to be used for full color motion applications. The major advantage of auto-stereoscopic viewing is that it does not require special eyewear in order to differentiate between left and right eye images. Instead, the three-dimensional image is a result of a simulated parallax effect produced by a range of simultaneous multiple available viewing angles as compared to just two separate left/right images as with stereoscopic imaging.

Although auto-stereoscopic will be the next natural progression in image technology after stereoscopic 3D, it is actually much more difficult to implement since it requires the simultaneous availability of multiple images containing different viewing angles. The quality of the 3D effect with auto-stereoscopic imaging is also dependent on the high number of available images, or angles of views available.

Some desirable benefits to viewing images in 3D include the fact that ordinary images tend to become much more interesting to view. The reproduction of depth causes one to be drawn to detail in a way that ordinarily would not occur.

The Dimensional™ Process

The term Dimensionalize™ Process describes and defines the method of converting standard two-dimensional images to 3D according to the present invention. The process fundamentally involves scanning images into a computer based system and, with the use of graphic image software and specialized custom software, creating a three-dimensional image that can then be used for viewing and for re-recording for three-dimensional viewing.

A three-dimensional stereoscopic image is composed of two images, a left and right angle of view simulating the natural stereoscopic distance of our eye separation. The Dimensionalize™ Process defines the original image as the reference, or left image. The right image starts off as being a duplicate of the reference (left) image but is to become the newly rendered image.

The fundamentals for Dimensionalizing™ images are to first establish the center, background, and foreground objects and subjects for dimensional placement. Graphic Image software may be used for placement and manipulation of the subjects or objects within a scene or image. Objects or subjects are defined typically by a person, who will be referred to as the Dimensionalist™. The Dimensionalist™ is a person who has the artist's task of drawing around the subjects or objects within the picture. Those identified objects will later be given depth by placing them forward and backward within the image. The Dimensionalist™ draws around objects thereby establishing "user definable" areas or regions.

It would be desirable to have a system including a computer with high-speed decision-making capability of recognizing picture content. Only then, with such computing intelligence would the human not have to take the time to identify and draw around objects. Unfortunately, even with the present state of technology, software to accomplish such a task does not yet exist. The properties that make up an object in an image or scene are too complex for a computer to have the ability to recognize picture content and isolate objects and subjects within a scene. There is not enough definable information whereby software can differentiate between all the image variables that contribute to that particular object or subject within a scene. In other words, if a scene contains a bunch of bananas in the foreground against a yellow background, the brain has a rather unique ability to recognize the bananas at all angles and lighting variations. Technology has not yet evolved to the extent that software has object and subject recognition capability.

There are some useful tools that can help differentiate certain values within an image such as hue and saturation of a color, or its brightness value. Even though these tools may be of use and may aid the process, a human must still be relied upon for the accurate determination of object identification.

Scanning the Film to Digital Storage:

Film images must first be scanned on a high quality motion picture film scanner. Each film frame must be pin registered in order to obtain the maximum image stability as possible. If the film images are not pin registered and moving around, the Dimensionalizing™ process will be enormously aggravated while trying to isolate objects and subjects from frame to frame. Additionally, if the frames are "weaving" left to right the end result 3D effect will be further reduced.

The film images are scanned at a sufficiently high resolution so that there is little or no apparent loss in resolution once the images are eventually re-recorded back onto new film stock, or reproduced by direct electronic projection. The most common motion picture aspect ratio is 1.85 to 1. Although most modern film scanners adequately scan and re-record images at 2,000 by 2,000 pixel resolution, the 1.85 aspect ratio frame is such that the vertical resolution is actually 1,300 pixels from top to bottom, with the remainder of pixels being discarded in order to conform to the 1.85 to 1 aspect ration. It is desirable to scan a film with as much pixel resolution as possible and practical. The drawback for increased pixel resolution is the file size for each scanned image.

It may be desirable to telecine transfer the film to a convenient format for previewing the amount of work required for the Dimensional project for that particular film project.

Color Correction:

Each frame that makes up the motion picture image has been scanned and stored in a high-density digital storage system. The images must be color corrected prior to the separation of images for three-dimensional rendering. Color correction is accomplished by the use of both hardware and software. Color correction with this process is sped up by performing the corrections on the lower resolution images while recording the parameters and translating those parameters applying the correction decisions to the high-resolution images. In this way the processing time may be deferred and automatically carried out on the high-resolution images while the operator is busy color correcting the next scene or scenes.

Filter Management & Application:

One of the advantages of digital imagery is the ability to apply image filters such as enhancements and film grain reduction that would not be possible otherwise. After the color correction decisions have been applied to the high-resolution images it may be desirable to apply varying levels of image enhancement to various frames or scenes. Although this may be monitored on the lower resolution format, results should be tested on the high-resolution images. Film grain reduction parameters may be viewed on the lower resolution images.

The Dimensionalize™ Process

Object Management:

The first step to Dimensionalizing™ an image is to establish and store all the user definable areas of each frame so they may be easily recalled from memory whether it is from hardware or software. Once the subjects are defined they may be recalled from one frame (or frame space) to the next. It should be noted that objects and subjects within a particular scene do not necessarily change frame-to-frame unless that scene contains very high motion content. It is not that high motion content does not exist; however, on the average, there is a much higher content of repetitive frame-to-frame image content. Therefore, the defined areas of objects or subjects may be carried or copied over from one frame to the next and then repositioned and modified for efficiency rather than having to redraw each and every frame from scratch. To redraw every image would be extremely tedious and take an extraordinary amount of time.

The defining process may be accomplished using the lower resolution images for increased speed. All object and subject defining parameters are recorded, translated, and applied to the high-resolution images. Processing time may again be deferred and automatically carried out on the high-resolution images thereby saving time.

Depth Management:

The way to cause an object to move away from the screen (i.e., away from the viewer) is to move the object within the right frame to the right of its corresponding object in the left frame. If the object in the right frame is in the same horizontal "X" pixel position as its complement in the left frame, the image will be at the same plane as the screen. If the object in the right frame moves to the left of its corresponding image in the left frame, the image will come out of the screen toward the viewer.

In addition to depth positional placement of objects it is also necessary to assign areas at any area of a selected object boundary whereby a dissolve will occur, at user definable pixel widths, across the selected object boundary from its assigned positional or depth algorithm to the adjacent positional depth algorithms surrounding that selected object. In other words, it is desirable to cause certain areas to gradually change from one depth assignment value over a number of predetermined pixels to another. The entire selected object boundary may be chosen, or a multiple section of that boundary may have assigned dissolve widths. With this method, we avoid having objects appear as "hard cutouts", instead they will appear to have more natural smooth transitions from front to back depth placement.

Scenes may be divided up into sections that contain similar object or subject positioning. Those scenes may be logged as "copy over" sections. Copy Over sections are sections whereby the depth placement of the objects or subjects from the first frame of a scene is copied over to subsequent frames that contain nearly the same object placement. The depth information that has been logged for the first scene must maintain its continuity throughout a scene otherwise the end result would show objects moving forward and back from the screen which would be a very undesirable effect.

The human element of the decision making process for determining the detail of objects and subjects and their subsequent placement of depth is very important to create an end result that appears real, as if the material were originally photographed in 3D.

Another important factor to the realization factor is the separation and placement of as many objects as possible and necessary. If a limited number of objects or subjects are placed in depth, an undesirable effect may occur hereinafter referred to as the "cardboard cutout effect". This is where a scene appears to be two-dimensional with the exception of a few objects that appear to be placed forward or back as cutouts.

Reconstructing Depth:

When objects are moved in and out of a scene they are repositioned on the horizontal X-axis of the image. Horizontal placement is typically done on a pixel-by-pixel basis as well as a sub-pixel basis. Although there is a correlation of depth and dimension to pixel placement, objects need to be monitored by the Dimensionalist™ for accuracy as there are too many variables affecting depth placement due to angles of the camera and angles of content within a scene.

When an object or subject is moved to the left or right, a gap of information or hole exists in the area between the image and where the image used to be. This gap must not be visible for the appearance of visual continuity and realism. A method for alleviating this problem is to "pixel repeat" the information across the transaction areas of the objects. In other words, if an object is shifted 10 pixels to the left in a frame, the areas to the right of the frame must be repeated, or copied 10 pixels over as the image is now shifted in its position. Nothing needs to be done on the left side since the image has now covered up new areas of the pre-existing picture. If pixel placement is of a large displacement, there may need to be some touch up to the large transition areas as to not cause a 3D image disparity.

Pixel repeating requires that the defined objects and subjects that have been outlined extend slightly larger in the horizontal direction and in the opposite direction of the required directional placement. If the defined objects are not slightly oversized, tearing of the moving image may result causing a very undesirable effect. Extending the defined areas is accomplished automatically by a single selection that causes this function to occur.

In a preferred embodiment, the system according to the present invention utilizes software and hardware to cause multiple tasks to occur for the purpose of saving time in the lengthy process of logging and memorizing all of the depth and dimensional properties of scenes. Having software routines step through many levels of the process at high rates saves time in what otherwise would be a very lengthy process.

Real Time 3-D Monitoring:

Unique to the Dimensionalize™ process is the ability to view the accuracy of the Dimensionalized™ frames in a real time 3-D environment while the objects or subjects are in the process of being placed.

Entire scenes may be tested for their accuracy and continuity by playing back and viewing the recorded 3D images of the film images at, for example, 24 frames per second. For example, at 24 fps, each left and right film frame is alternately displayed into a monitoring system being displayed at a 1024 by 768 lines at 120 progressively scanned frames per second. This may be accomplished by playing back the data representing 24 frames per second and alternately switching between the data of the right and left image until each film frame is displayed five times. If the original film frame rate happened to be 30 frames per second instead of 24, then the frames get repeated four times rather than five.

Correlation of Depth, Distance and Dimension:

Viewing 3D images with continuous depth causes the viewer to be drawn to detail. For this reason, it is important to assign depth values of objects or subjects that accurately reconstruct the image as close as possible within a visually acceptable realm. Additionally, the more objects and subjects placed, the more real an image will appear, as if it were originally photographed in 3D.

Some images may be more difficult to Dimensionalize™ than others. Scenes that are typically easiest to Dimensionalize™ are those where the camera angle is such that objects are seen as a direct head on view against backgrounds with no apparent "Continuous Running Depth". An example of "Continuous Running Depth" is where you can actually see something continuously stretching its way from the foreground of the image into the background. In this situation, skewing may be appropriate to simulate the different dimensional properties of the re-created right camera view.

Camera angles dictate the complexity of the Dimensionalize™ process. The more complex the angle, the more complex the math for defining and assigning placement values representing depth and dimension.

The Object Manager

The Object Manager displays the picture frames and the selected objects in such a way that the process of drawing and manipulation of objects frame-to-frame can be done within a reasonable amount of time. With 1,440 frames for every minute of running time, at 24 fps, the process must be accelerated, otherwise, the time involved to Dimensionalize™ (i.e., to create a 3D image out of a 2D image) would be highly impractical and cost prohibitive.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIGS. 3A–3H show an original image with various objects or portions of objects selected and outlined according to the present invention;

FIG. 4 illustrates how objects or portions of objects of a duplicated image are selected and displaced horizontally relative to an original image to form a complementary image;

DETAILED DESCRIPTION OF THE PREFERRED EMBODIMENTS

Figure 1:
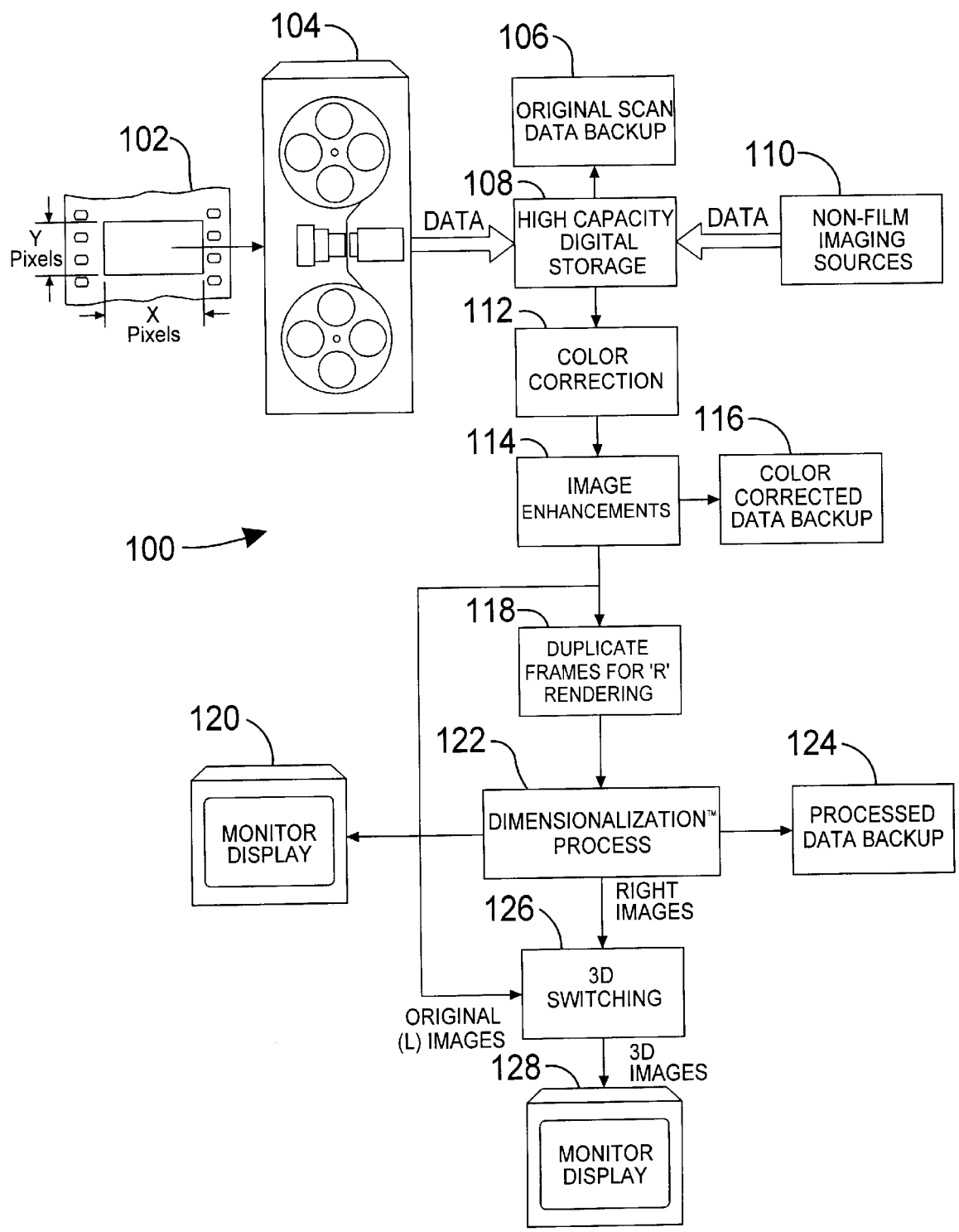
FIG. 1 is a flow diagram of an exemplary processing method for converting two-dimensional images into three-dimensional images according to the present invention.

Referring to FIG. 1, an exemplary processing method 100 for converting two-dimensional images into three-dimensional images is illustrated. According to the present invention, at step 108, image data (DATA) is provided to a high capacity digital storage device. For example, a source of two-dimensional images 102 (such as 35 mm, 16 mm, 65 mm or 70 mm motion picture film) is processed by a scanner mechanism 104 to provide the DATA. Alternatively, the DATA can be provided from non-film imaging sources 110 (such as a digital camera). In a preferred embodiment, at step 106, a backup copy of the DATA is stored.

According to the illustrated processing method 100, (optional) preliminary image processing steps 112 and 114 provide for color correction and image enhancements, respectively. At step 116, a color corrected data backup is saved. At step 118, image frames are duplicated for rendering—according to the Dimensionalization™ processing (step 122) of the present invention—into one of a pair of images (e.g., the right or "R" image) for a 3D stereoscopic image pair. One or more monitors (e.g., the illustrated monitors 120, 128) provide an interactive user interface which allows a user of the Dimensionalization™ process to render complementary images, view rendered images, defined objects in images, resulting 3D images, etc. For example, at step 126, 3D switching between an original image and a rendered image is effected to provide the original image and the rendered image to the monitor 128 as the left (or "L" image) and the right (or "R" image), respectively. At step 124, data relating to the Dimensionalization™ processing is stored. All processing according to the present invention can be performed by a single processor, by several processors, or by a combination of processors, firmware and hardware depending upon the specialized requirements of any particular system.

Figure 2:
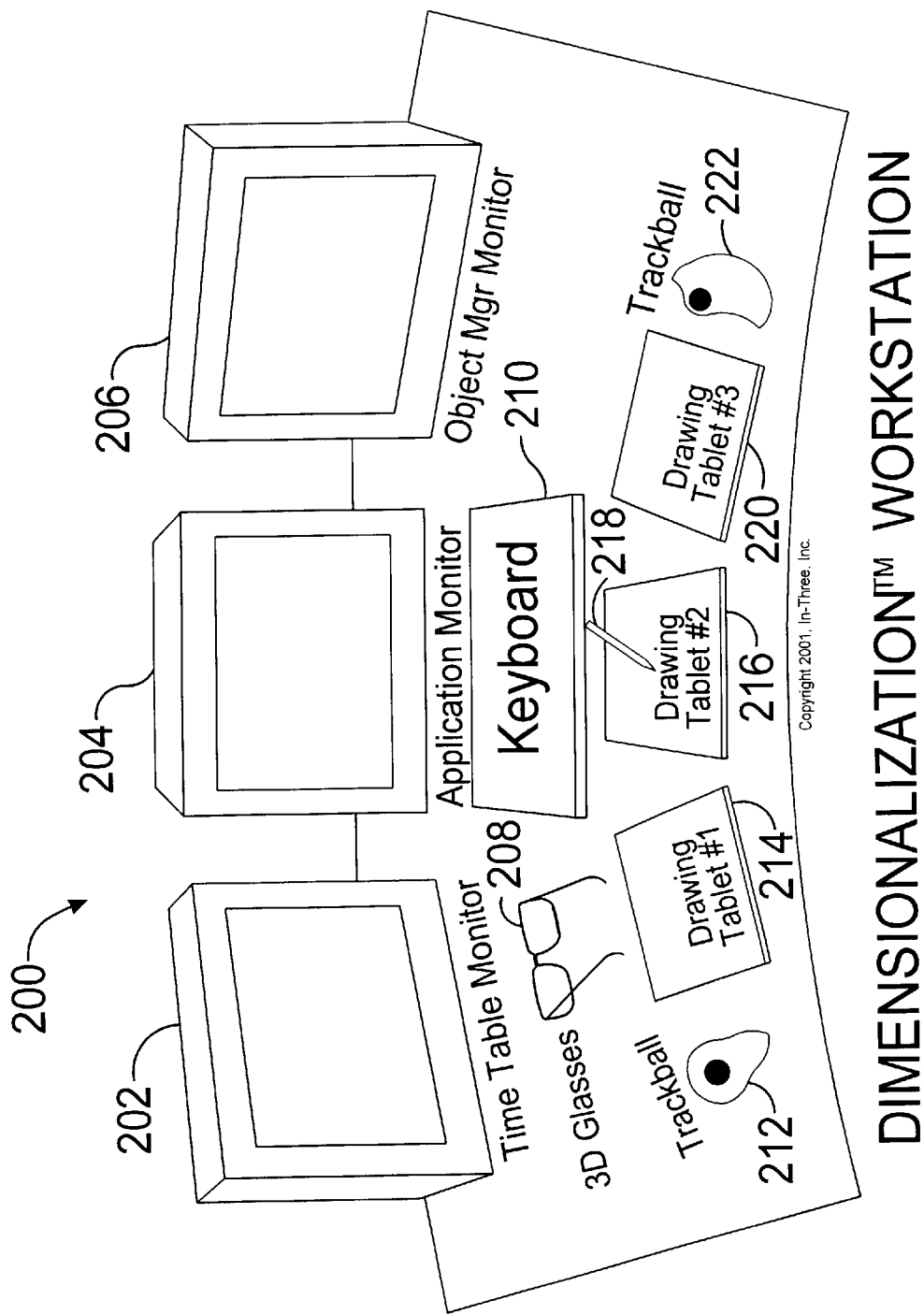
FIG. 2 illustrates an exemplary workstation for implementing the image processing techniques of the present invention.

Referring to FIG. 2, a workstation 200 according to the present invention includes one or more video monitors which provide a user of the Dimensionalization™ process with an interactive interface through which a plurality of original images can be duplicated and rendered into a plurality of complementary images. More specifically, the interactive interface embodies a plurality of tools particularly adapted to facilitate rendering of the complementary images such that each resulting complementary image and its corresponding original image provide a stereo pair of images for a three-dimensional image.

The exemplary workstation 200 shown in FIG. 2 includes a time table monitor 202, an application monitor 204, an object manager monitor 206, three-dimensional glasses 208 and one or more user input mechanisms such as a keyboard 210, trackballs (or mouse) 212, 222, drawing tablets 214, 216, 220 and a drawing pen 218. The workstation also includes a processor/controller which is programmed to provide signals to the monitors 204, 206, 208, control the visual displays at these monitors, and receive and process user inputs provided to the system via the user input mechanisms 210, 212, 214, 216, 218, 220, 222, i.e., control the interactive interface. The processor/controller is also programmed to control the rendering of the complementary images from the original images in response to inputs provided by the a user of the workstation. The processor/controller is additionally programmed to provide, in conjunction with the three-dimensional glasses 208 (which receive a synchronizing signal from the processor/controller), a three-dimensional image at the application monitor 204 which is updated in real time thus allowing the user to observe changes in the depth or placement of various objects within the three-dimensional image. As described below in greater detail, the object manager monitor 206 is employed to display the original images and/or copies of the original images as they are rendered into complementary images. The processor/controller is programmed to allow the user to select objects within images and to horizontally reposition portions of these objects within the complementary image automatically via a plurality of interactive tools which include object rendering functions. It should be understood that the functions implemented by the processor/controller can be performed by one or more processor/controller to optimize system performance or accommodate other design objects and constraints.

Figure 3A:
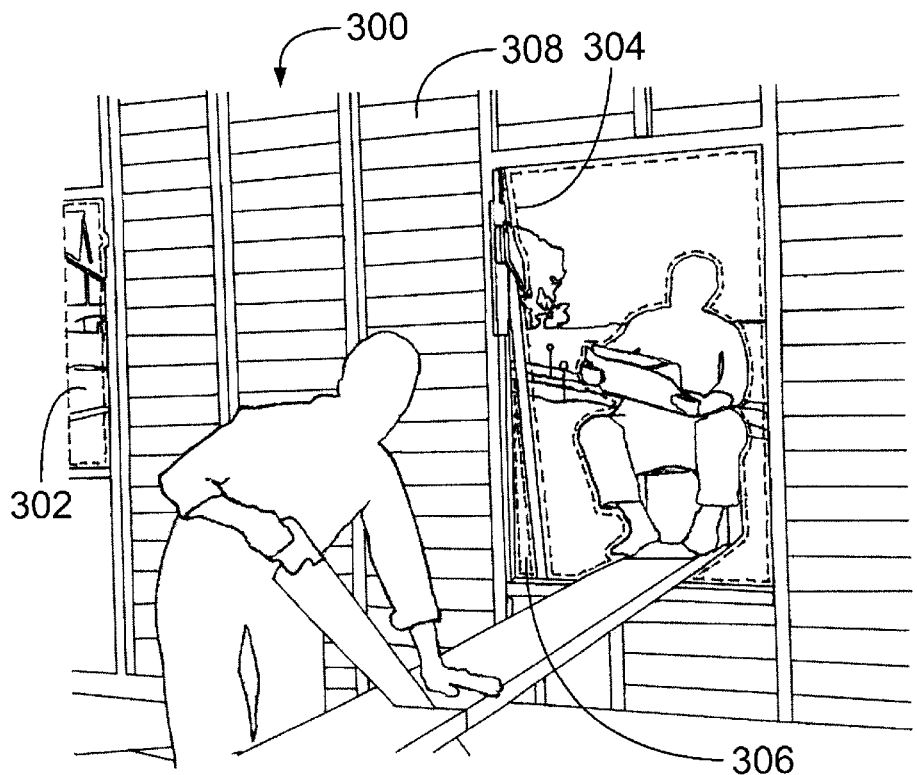

FIGS. 3A–3H show an original image with various objects or portions of objects selected and outlined according to the present invention. Referring to FIG. 3A, a user of the workstation 200 employs one of the drawing tablets 214, 216, 220 and the drawing pen 218 to outline with dashed lines, within a duplicated original image 300, objects 302, 304, 306 which are further from the viewer than the building wall 308. Selected objects are repositioned horizontally within the duplicate image 300 depending upon their depth. At the present time, object recognition software does not exist which is sufficiently advanced to reliably automate the identification of objects within an image and the assignment of a depth placement or value to each identified object. However, and notwithstanding the plurality of interactive object rendering tools provided by the workstation 200, it should be understood that the scope of the present invention additionally contemplates a workstation 200 wherein the processor/controller is programmed to process the digitized duplicate images to at least partially automate the identification of objects and assignment depth values to the objects.

Figure 3B:
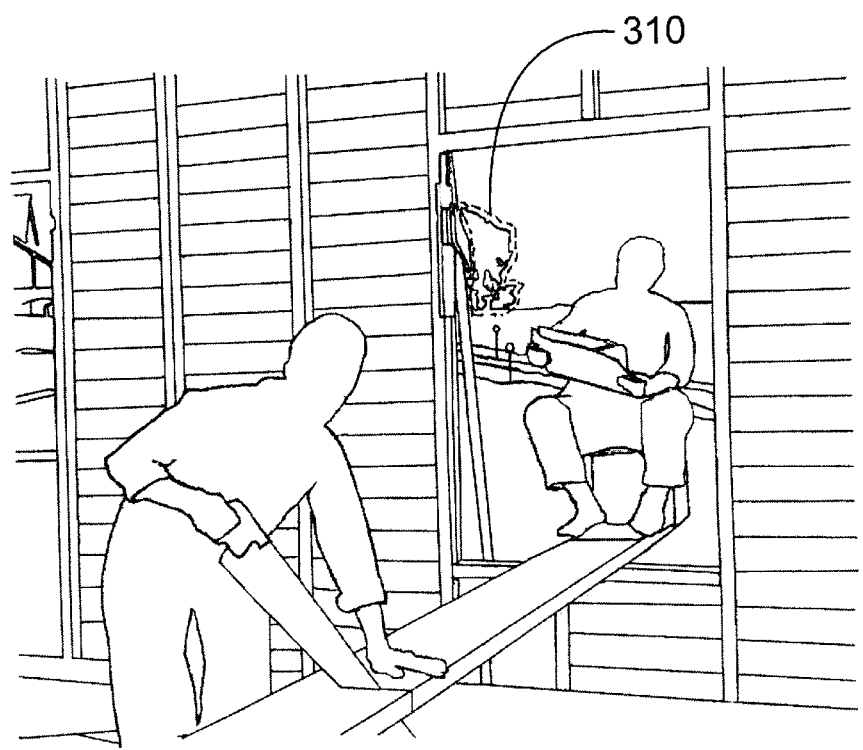
Figure 3C:
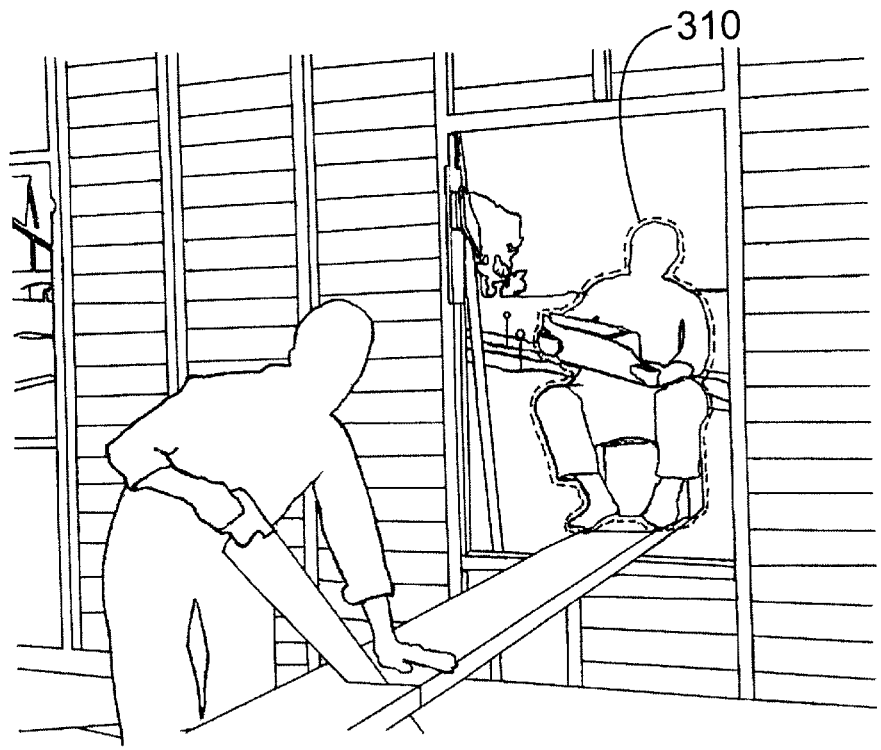

FIG. 3B shows a distant object 310 which has been outlined. FIG. 3C shows an object 310 with a depth placement in between the wall 308 and the distant object 310.

Figure 3D:
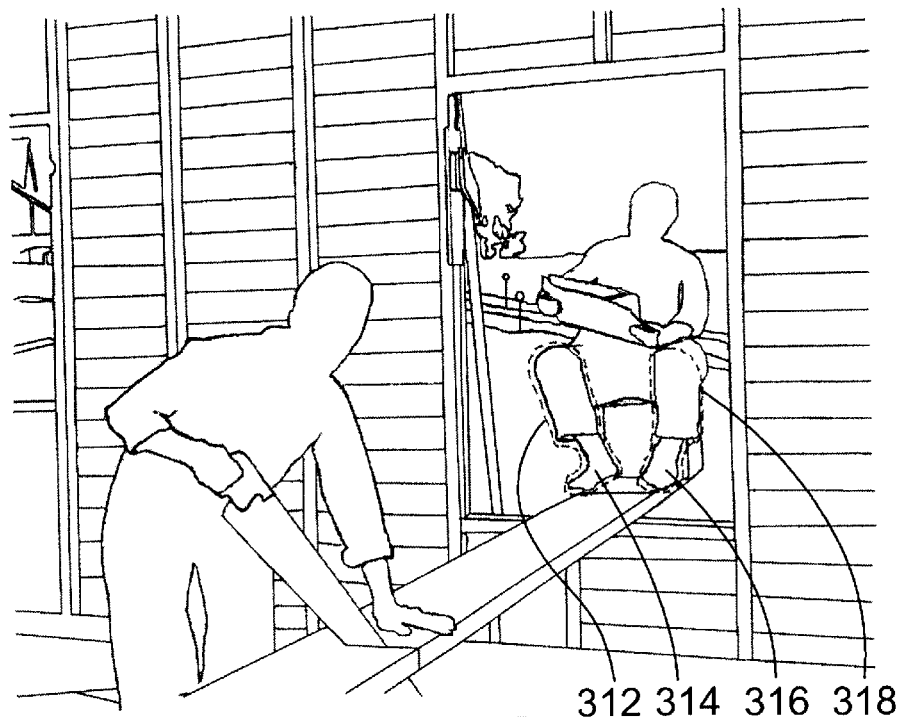
Figure 3E:
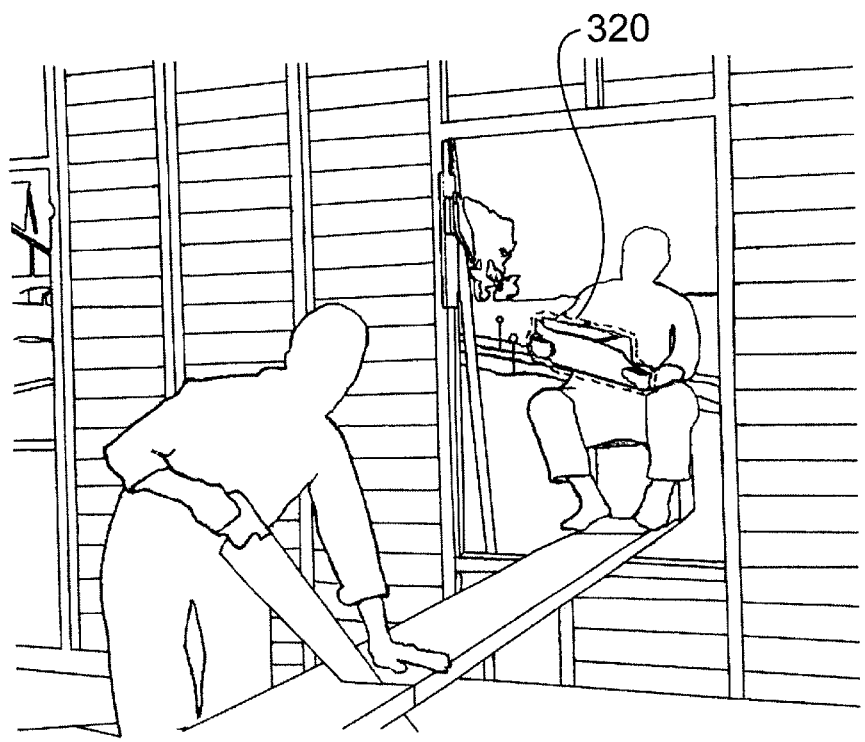

FIG. 3D illustrates another important aspect of the present invention, namely, that objects within other objects can be selected by the user. More specifically, FIG. 3D shows objects 312, 314, 316, 318 which are sub-objects of object 310 and which have depth placements in between the wall 308 and the object 310. This aspect is further illustrated in FIG. 3E which shows an object 320 which is also a sub-object of object 310 and which has a depth placement in between the objects 312, 314, 316, 318 and the object 310.

Figure 3F:
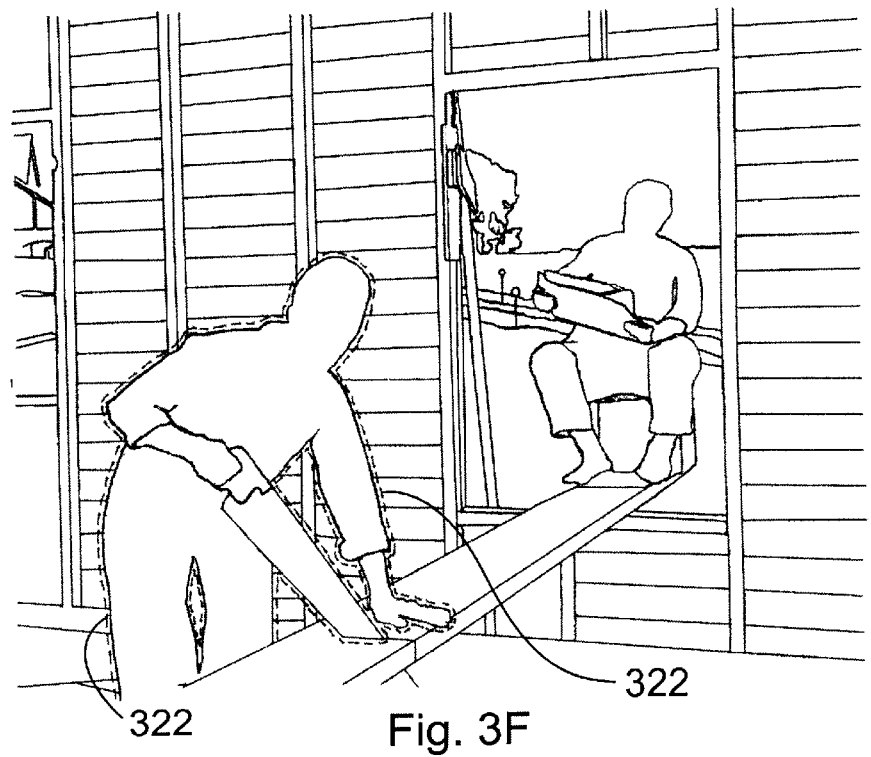

FIG. 3F shows a selected object 322 which is nearer to the viewer than the wall 308. FIG. 3G shows a selected object 324 which is a sub-object of object 322 and which is still closer to the viewer than the object 322.

A key aspect of the present invention is that the workstation 200 includes a plurality of object rendering tools that automate the horizontal translation of the selected objects and, more specifically, determine how far various portions of the selected objects are to be translated. This critical aspect takes into account the fact that many objects are not uniform in distance from the viewer throughout the object. For example, and as shown in FIG. 3H, object 326 varies in distance from the viewer from point 328 to point 330 according to a linear relationship. The workstation 200 includes an object rendering tool adapted to automate the horizontal translation of portions of the object 326 between points 328, 330 according to a linear function. As discussed below, the workstation 200 also includes object rendering tools that apply other types of functions in horizontally translating portions of selected objects, e.g., sinusoidal and non-linear functions as well as functions that render a plurality of different surfaces within the selected object.

Figure 8A:
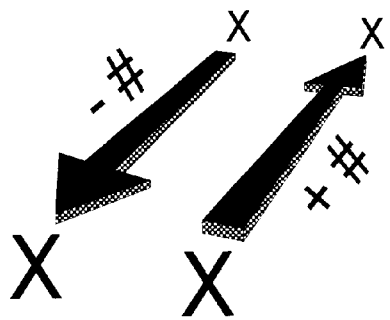
FIGS. 8A–8H conceptually illustrate exemplary preferred object rendering functions of the workstation of FIG. 2.

FIGS. 8A–8H conceptually illustrate exemplary preferred specialized object rendering functions of the workstation 200. FIG. 8A illustrates that an object or portion of an object, e.g., a left or right border of a selected object, can be repositioned horizontally within the duplicate image, either to the left or to the right depending upon whether the object to be rendered is to appear closer to the viewer or further away from the viewer in the projected or displayed 3-D image.

Figure 8B:
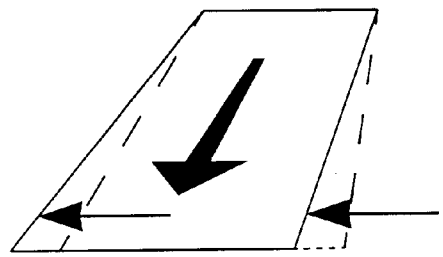

FIG. 8B illustrates that a selected object can be repositioned different amounts from one portion of the object to another. This "skew" rendering function is particularly well suited for creating an illusion of graduated, or linear, depth change from a near portion of the object to a far portion of the object as is desirable for the object 326 (FIG. 3H).

Figure 8C:
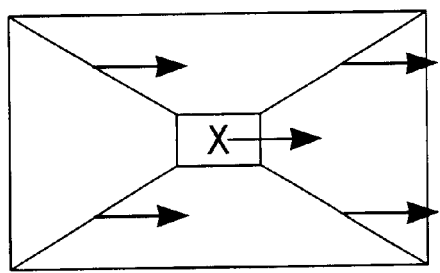

FIG. 8C illustrates that a "skew" can be applied to a plurality of different portions of a selected object to simulate, for example, a "bend" within the object. Similarly, FIG. 8H illustrates that a "corner push" object rendering function can be made available as a semiautomated tool which only requires that the user identify a predetermined group of boundaries within the object and specify ranges of horizontal repositioning distances, minimum and maximum numbers of pixels to be shifted, or the like.

Figure 8D:
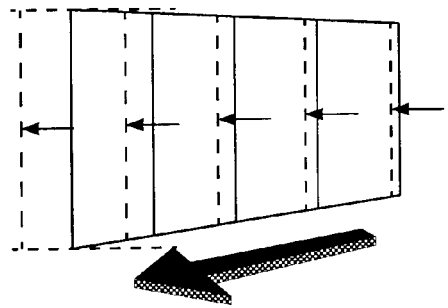

FIG. 8D illustrates a "stretch" object rendering function which is similar to the "position" function of FIG. 8A but instead stretches an object horizontally. The "stretch" function can be realized through pixel repeating or by extrapolating and expanding vertical columns of pixels depending upon the particular application.

Figure 8E:
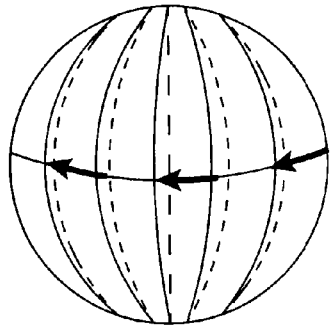
Figure 8F:
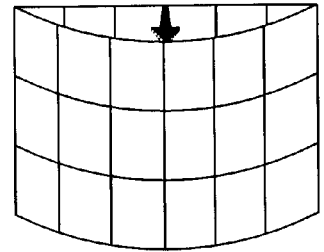
Figure 8G:
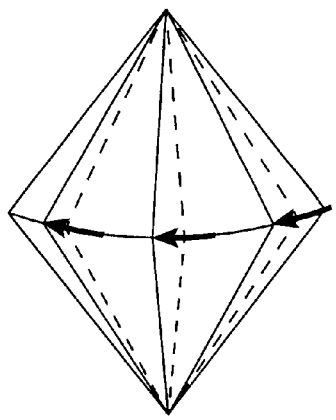
Figure 8H:
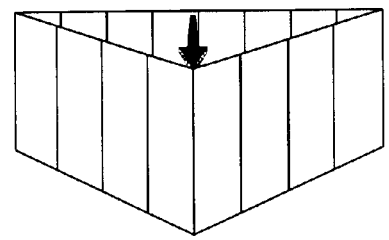
Figure 8I:
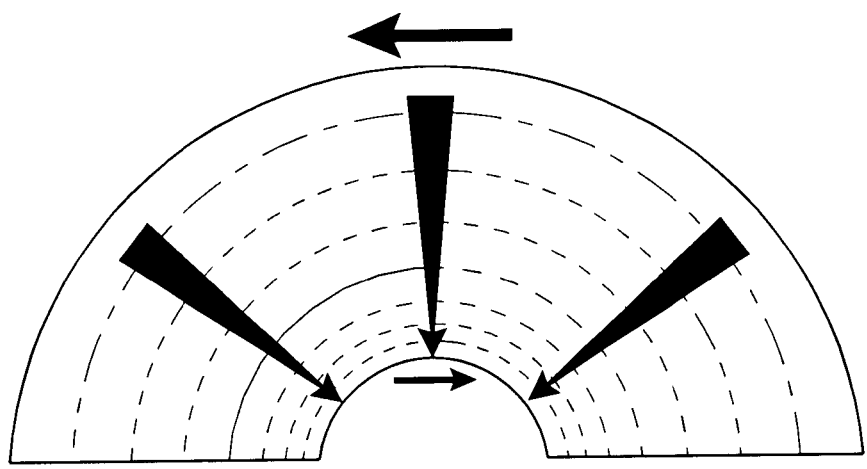
Figure 8J:
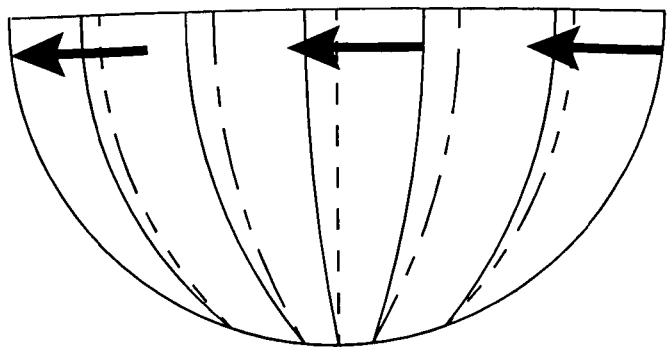

FIGS. 8E, 8F and 8G illustrate that object rendering functions including sinusoidal or circular components can also be made available to the user. The "straight bulge" illustrated in FIG. 8F allows the user to apply, for example, a sinusoidal depth adjustment along a predetermined axis within the two-dimensional object to be repositioned. Although the bulge of FIG. 8F is about a vertical axis of the object, it should be understood that the aforementioned axis can also be horizontal or positioned at any other angle in between vertical and horizontal.

The "spherical bulge" of FIG. 8E is similar to the "straight bulge" of FIG. 8F but instead applies a depth adjustment to portions of the selected object according to a two-dimensional circular surface rendering function. The "cone bulge" of FIG. 8G applies both a circular function and a linear function to portions of the selected object to determine how each portion is to be repositioned. An image processing method for converting two-dimensional images into three-dimensional images according to an embodiment of the present invention includes the step of: applying depth information associated with a tunnel shape to a defined object in an image such that a perceived depth of the defined object transitions from an outer arc in the foreground to an inner arc in the background or vice versa. It should be understood that other object rendering functions than those explicitly disclosed herein are also contemplated as being within the scope of the present invention.

FIG. 4 illustrates how objects or portions of objects of a duplicated image are selected and displaced horizontally relative to an original image to form a complementary image. FIG. 4 shows an original image and a duplicate of the original image that has been rendered into a complementary image superimposed over the original image. The original image includes an original fixed depth object 402, an original graduated depth object 404, and an original non-linear depth object 406. The complementary image includes a complementary fixed depth object 408, a complementary graduated depth object 410, and a complementary non-linear depth object 412. The complementary fixed depth object 408 is rendered by employing an object rendering function such as the "position" function of FIG. 8A. The complementary graduated depth object 410 is rendered by employing an object rendering function such as the "skew" function of FIG. 8B. The complementary non-linear depth object 412 is rendered by employing an object rendering function such as the "spherical bulge" function of FIG. 8E. Object 414 is positioned at mid-range distance and therefore its complementary object is superimposed directly over it.

Figure 5:
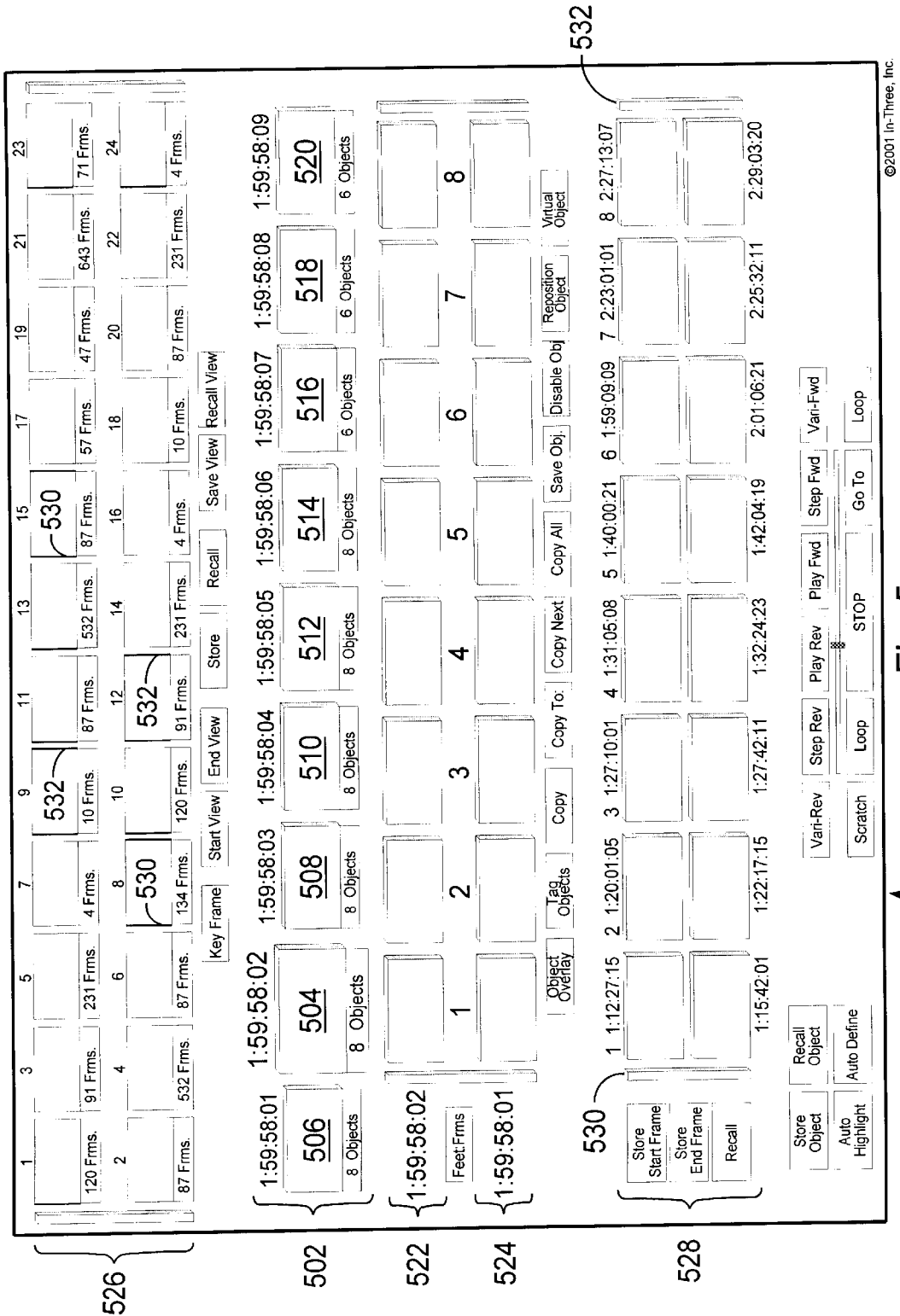
FIG. 5 shows an exemplary preferred embodiment of an Object Manager visual display of the workstation of FIG. 2.

Another key aspect of the present invention is that the workstation 200 allows the user to render a plurality of similar complementary images by recalling, and, as appropriate, adjusting object rendering information already established for a similar complementary image, typically within the same movie scene. FIG. 5 shows an Object Manager visual display 500 which, in a preferred embodiment, is presented on the monitor 206 (FIG. 2) of the workstation 200. Referring to FIG. 5, an operative frame portion 502 shows a current image 504, a previous image 506, and seven subsequent images 508, 510, 512, 514, 516, 518, 520. The Object Manager visual display 500 also includes a current frame objects portion 522 and a previous frame objects portion 524 which, in the illustrated example, show the objects of the current image 504 and the previous image 506, respectively. Among its various functional capabilities, the Object Manager visual display 500 allows a user of the workstation 200 to copy previously rendered objects from one frame to another, e.g., by grabbing and sliding objects from one image to another.

A View Table portion 526 allows the user to apply rendered objects of one group of images to another group even if the groups of images are not adjacent, such as in A/B cuts. A Scratch Pad Memory portion 528 includes a top row of start frames and a bottom row of end frames for stored 3D video "clips". After activating the Scratch Pad Memory portion 528 by selecting the Scratch switch on the Object Manager visual display 500, clips can be defined by employing the Store Start Frame and Store End Frame switches. The Recall switch is employed to access a selected stored clip for playing the clip, e.g., by employing the Loop switch, the Play Fwd switch, or another switch which controls the viewing of image sequences at the workstation 200. Although the start and stop frames of eight clips are shown in FIG. 5, any number of clips can be stored. To view (scroll) to previously or subsequently stored clips, the scroll bars 530, 532 are employed, respectively. Similarly, with respect to the current frame objects portion 522, the previous frame objects portion 524 and the View Table portion 526, additional stored frames objects/images besides those displayed can be accessed (scrolled to) by employing the scroll bars to the left and right of these portions of the Object Manager visual display 500.

In a preferred embodiment, the View Table portion 526 is implemented and controlled such that views in which objects have been stored will be visually indicated as such, e.g., with colored bar indicators 530 on the left side of the view frames. In a preferred embodiment, colored bar indicators 532 (a different color than indicators 530) are provided on the right side of the view frames to indicate that depth values have been stored. In a preferred embodiment, similar indicating bars are provided for the current frame objects portion 522 and the previous frame objects portion 524, indicating that objects have the same depth values or objects that are referenced together.

It should be understood that the object manipulation capabilities of the Object Manager visual display 500 can also be used in conjunction with the keyboard 210 (FIG. 2) and that functions can be shared and/or migrated between the two as desired to accommodate particular applications, user preferences, etc.

Another key aspect of the present invention is that the processor/controller is adapted or programmed to generate visual display control signals such that the visual displays at the monitors 202, 204, 206 (FIG. 2) include a plurality of image regions depending upon the stage of the Dimensionalization™ process and the user inputs provided. These image regions include original image regions, duplicate image regions, complementary image regions, 3-D image regions, and object regions in various combinations. For example, one or more of the monitors 202, 204, 206 can be controlled to provide an image region for an original image, duplicate image, complementary image, or 3-D image region as desired. One or more of the monitors 202, 204, 206 can be controlled to provide an object region with sub-regions that individually show selected objects in the image region. In a preferred embodiment, selected objects are shown in outline only, or in silhouette or reverse silhouette.

With respect to employing color correction processing in conjunction with Dimensionalization™ processing, each frame that makes up the motion picture image has been scanned and stored in a high-density digital storage system. The images may be color corrected prior to the separation of images for three-dimensional rendering. Color correction is accomplished by the use of hardware and/or software. Color correction with this process may be sped up by performing the corrections on the lower resolution images while recording the parameters and translating those parameters, applying the correction decisions to the high-resolution images. In this way the processing time may be deferred and automatically carried out on the high-resolution images while the operator is busy color correcting the next scene or scenes. Color correction may also be significantly sped up by having the software program perform calculations in the background in anticipation of use. The background processing is transparent to the operator while the operator may be involved in other tasks. The advantage of performing background calculations is that the processed information is made much more readily available for use by the operator.

Color correction involves changing the color balance of each scene. Color balance is whereby the red, green, and blue whole components that make up the fill color image are varied in linear and non-linear amounts. Color balance typically involves adjustment of the blacks or low light areas of an image, the gammas or mid gray areas, and the whites or highlight areas of an image. The Dimensionalize™ system makes use of color correction tools which are part of present day graphic programs such as Adobe Photoshop and the like. Selectable area color correction is made use of if necessary by defining, or drawing around particular areas of an image and applying color correction parameters to those selected areas. Although selectable area color correction may be useful, it is used only when necessary as it may slow down the entire color correction process.

As part of the Dimensionalize™ Process, all color correction tools within the operated graphics software may be utilized and therefore instructed by the primary computer to execute commands, or a series of commands upon a batch, series, or entire sequence of images.

The color correction parameters, or the instructions for color corrections used to color correct a series of images, may be carried out on high resolution images after the color correction decisions have been determined and stored using lower resolution images or in the background while other processes are being performed.

Figure 6:
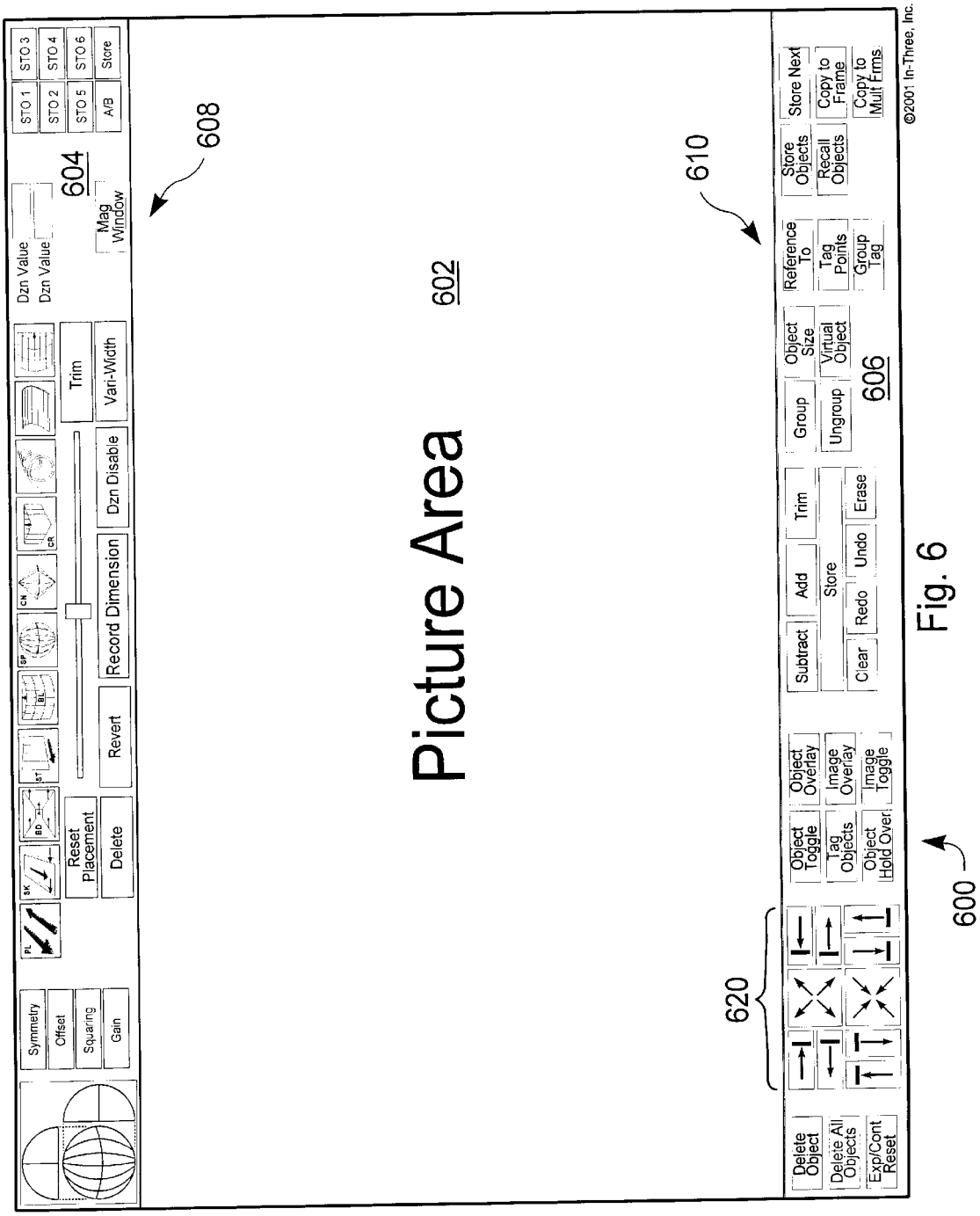
FIG. 6 shows an exemplary preferred embodiment of a Dimensionalize™ Manager visual display of the workstation of FIG. 2.
Figure 6A:
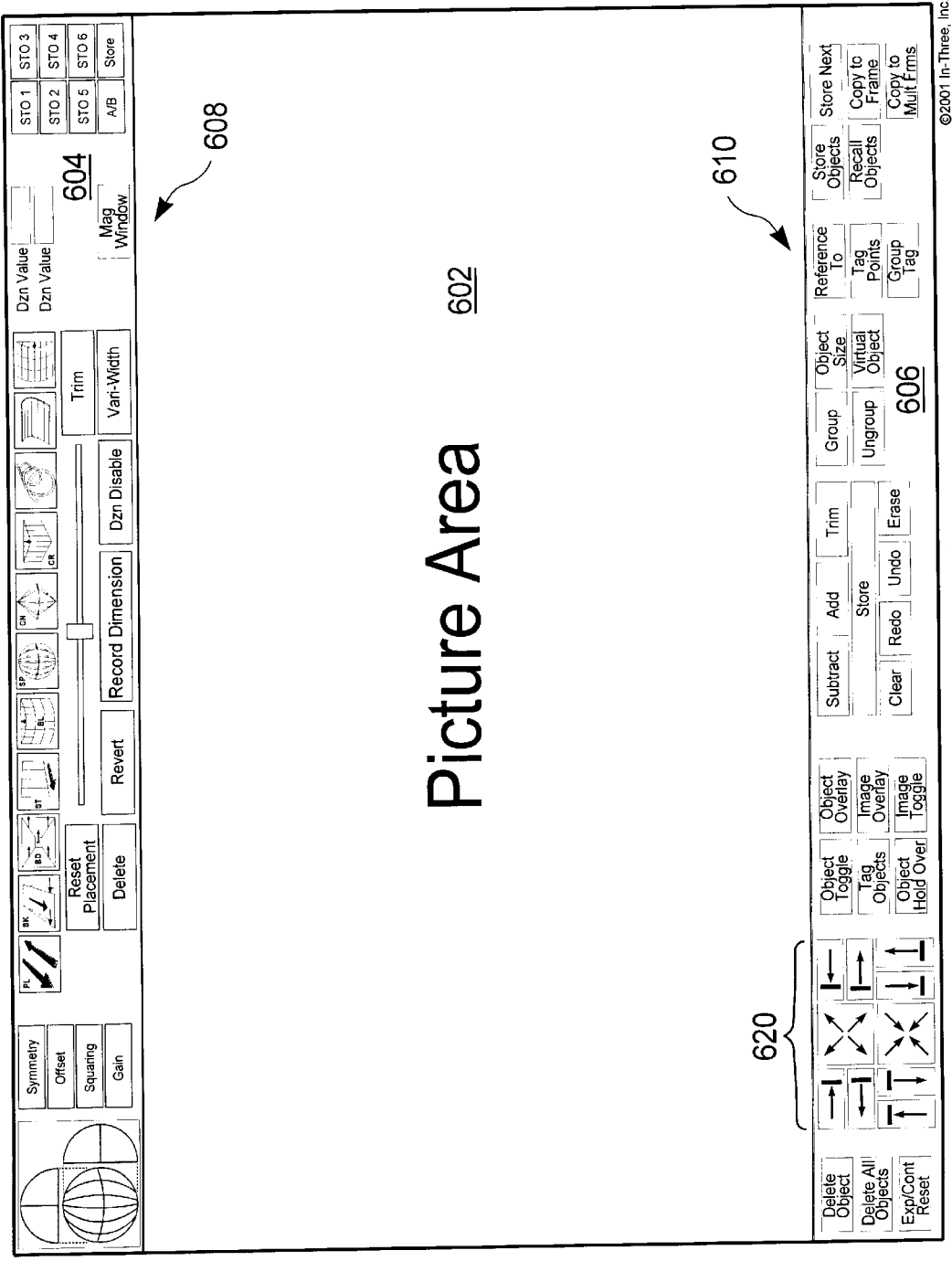
Figure 6E:
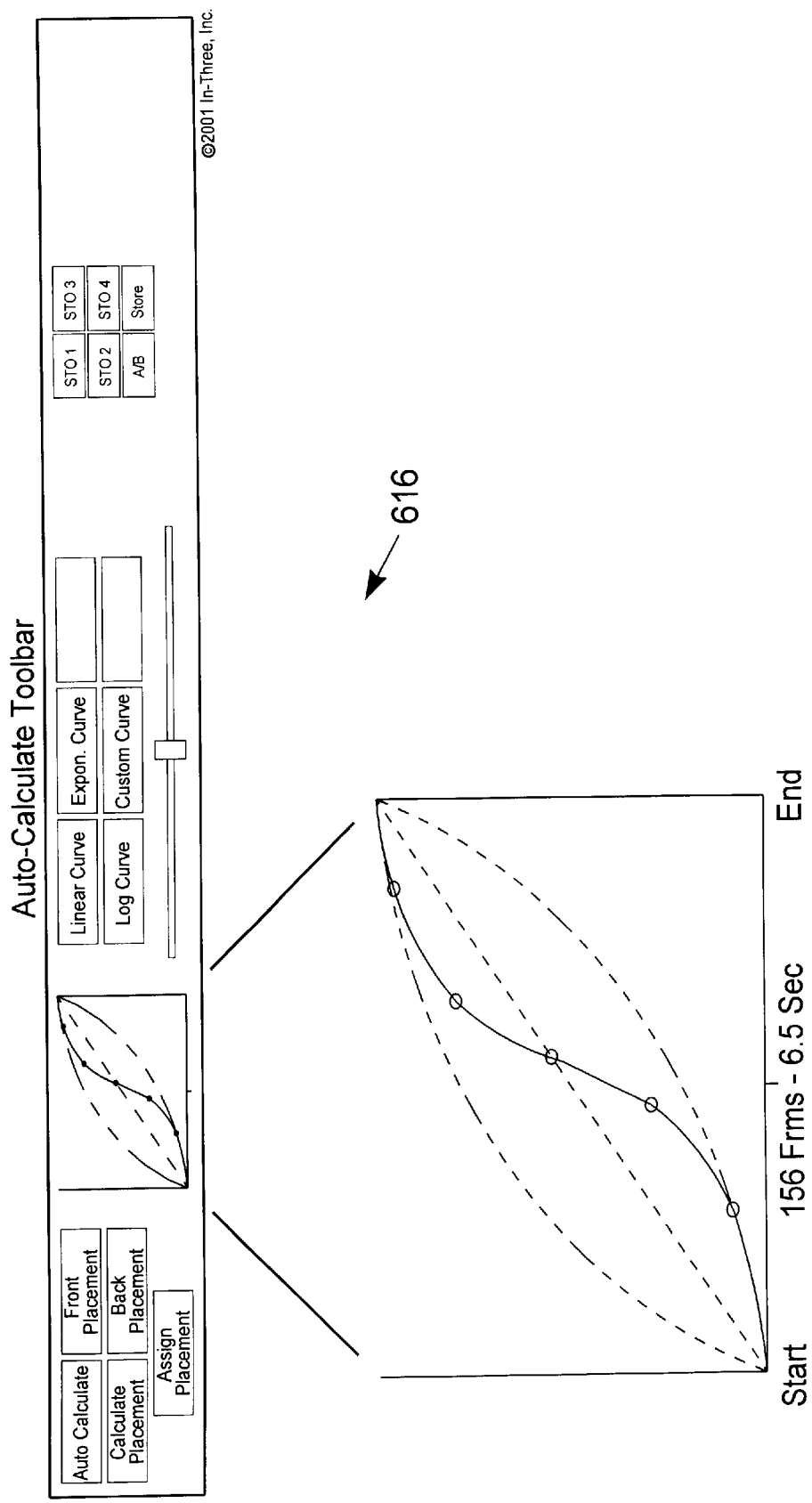

FIG. 6 shows an exemplary preferred embodiment of a Dimensionalize™ Manager visual display 600 of the workstation 200. Generally, the Dimensionalize™ Manager visual display 600 provides an interface through which the user applies object rendering functions to selected objects. While the Dimensionalize™ Manager visual display 600 is shown separately from the Object Manager visual display 500 of FIG. 5, it should be understood that the system features made available to the user through these displays can be presented through a single visual display or through additional visual displays depending upon the particular nature of the system and its intended applications.

The Dimensionalize™ Manager visual display 600 is controlled by the processor/controller and, in a preferred embodiment, is provided at the application monitor 204. The Dimensionalize™ Manager visual display 600 is used in conjunction with the user input mechanisms 210, 212, 214, 216, 218, 220, 222 and, in the illustrated example, includes a picture area 602 which is preferably provided so as to maintain a 1.85 to 1 aspect ratio. The illustrated Dimensionalize™ Manager visual display 600 also includes an upper tool bar area 604 and a lower tool bar area 606 positioned above and below the picture area 602, respectively. In FIG. 6, the upper tool bar area 604 is controlled so as to provide a Dimensionalization™ Toolbar 608, and the lower tool bar area 606 is controlled so as to provide a Object Manager Toolbar 610. Other toolbars such as an Object Drawing Toolbar 612 (FIG. 7) can be selectively provided in the upper tool bar area 604 and/or the lower tool bar area 606 as controlled by the user, for example, using a function key of the keyboard 210 or some other user input mechanism to cycle through a plurality of different toolbars.

Referring to FIG. 6, the Dimensionalization m Toolbar 608 provides a row of switches for object rendering functions such as "position", "bend", "stretch", "straight bulge", "spherical bulge", "cone bulge" and "corner push". When a user of the workstation 200 selects an object rendering function, an interactive graphics window or the like is presented within the picture area 602. In a preferred embodiment, implementation of a selected object rendering function is effected by inputting function parameters or variables via a "pop up" interactive graphics window. For example, if a "skew" function is selected, the user employs the interactive interface to select depth placements for the front and back of the object being rendered. Once the front and back of an object have been assigned placement values, a calculate placement switch (for example) is activated by the user. In response, the processor/controller calculates the placement of all points in between the front and back of the selected object according to the "skew" object rendering function. The resulting placement values can be applied to the selected object of one frame or the selected objects of a plurality of frames.

Among its additional features, the Dimensionalization™ Toolbar 608 includes Record Dimension, Reset Placement and Revert switches. By way of example, the Record Dimension switch is employed to store an object rendering function with particular user input values. The Reset Placement switch is used to reset the various parameters of an object rendering function to a predetermined set of start parameters. The Revert switch reverts the rendering of an object to a previous rendering. It should be understood that the aforementioned switches (any of the switches, for that matter) can alternatively be provided at the keyboard 210 rather than in a visual display.

Figure 7:
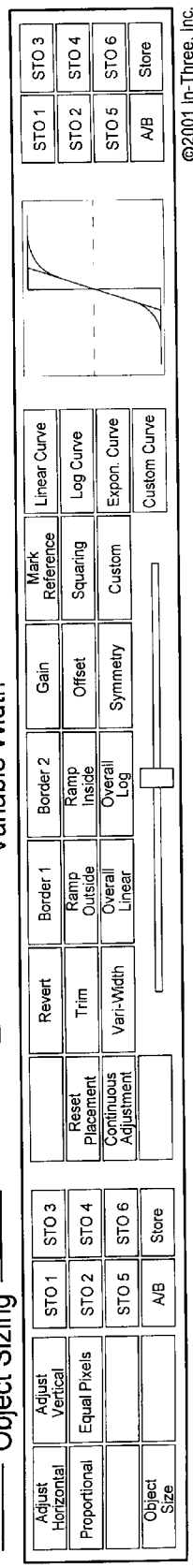
FIG. 7 shows an Object Drawing Toolbar for the visual display of FIG. 6.

With reference to FIGS. 5–7 and additional figures as indicated, a set of features for an exemplary preferred Dimensionalization™ workstation 200 is now described.

"Virtual Objects"

Figure 9A:
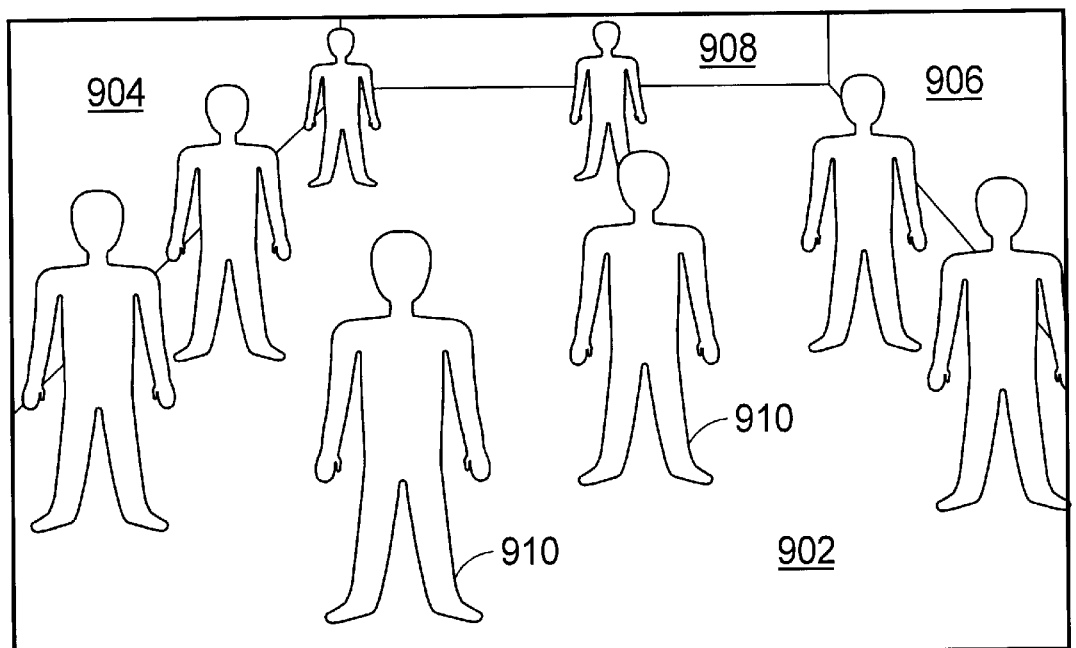
FIGS. 9A and 9B illustrate the "Virtual Objects" feature of the present invention.
Figure 9B:
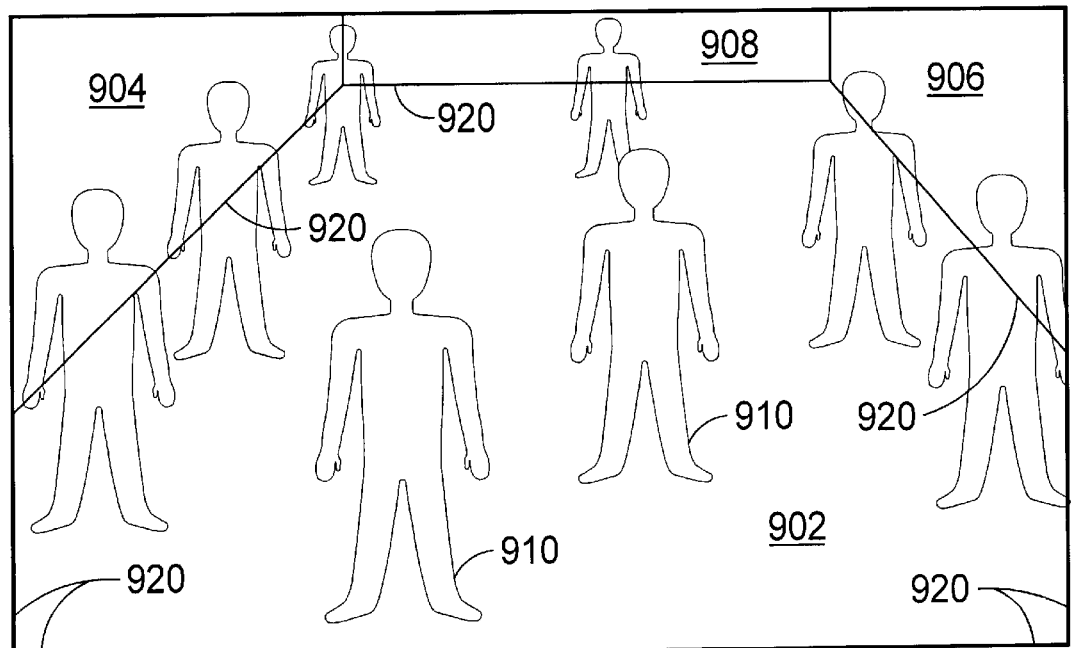

"Virtual Objects" are objects that are drawn without foreground objects in the way. It is desirable to have "Virtual Objects" whereby objects are drawn without the interference of any foreground or background objects. In other words, if an object is drawn, such as a floor, for example, the floor is drawn imagining that only the floor exists in the image. Any objects on the floor are not drawn. The purpose of this is so that the algorithm applied to the floor follows the virtual floor. Referring to FIG. 9A, an image 900 includes a floor 902, a left wall 904, a right wall 906, a back wall 908 and a plurality of people 910. Referring to FIG. 9B, a six-sided outline 920 is drawn as a "virtual floor". More specifically, the "virtual floor" is defined by excluding the people 910 from the outline 920, so that an algorithm, a skew in this case, can be applied to the floor that takes into account the absence, or rather cutouts of the people. The people 910, as separate objects will have there own algorithms applied, separate from the floor. In the case of a skew algorithm, each person standing on the floor is typically "Referenced To" (discussed below) the floor where they stand, or rather, where their feet happen to be in the same depth plane.

An image processing method for converting two-dimensional images into three-dimensional images according to an embodiment of the present invention includes the steps of: defining a virtual object in an image by excluding one or more objects from an area of the image; and employing a depth adjustment algorithm to reposition pixels of the virtual object within the image. The software is designed such that pixel repeating will automatically adjust itself accordingly to fill gaps where the objects may have separated.

The Virtual Object feature is accessible to a user of the workstation 200 via the Virtual Object switch in the Object Manager visual display 500 (FIG. 5) or the Virtual Object switch in the Object Manager Toolbar 610 (FIG. 6). Accordingly, here is an example of redundant switch access to particular features of the Dimensionalization™ workstation 200 which may be desirable for features which are frequently or to accommodate ergonomic or other considerations.

Figure 15A:
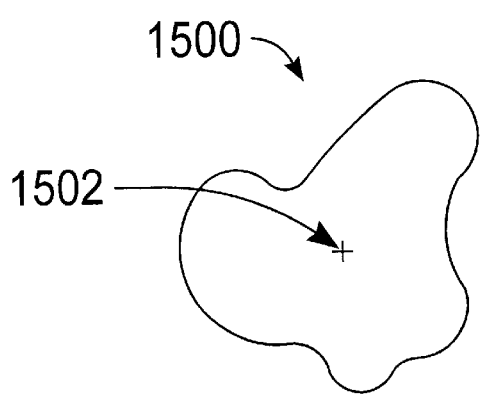
FIGS. 15A–15E illustrate the "Grab & Bend" feature of the present invention.
Figure 15B:
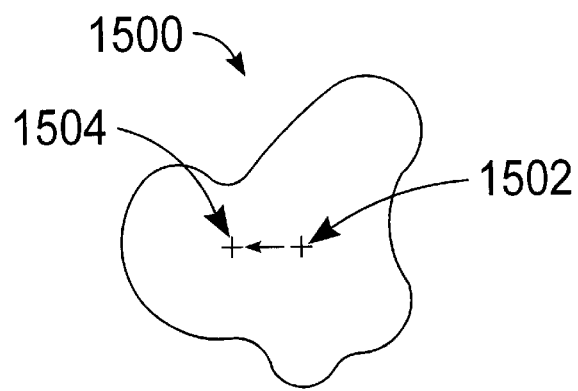
Figure 15C:
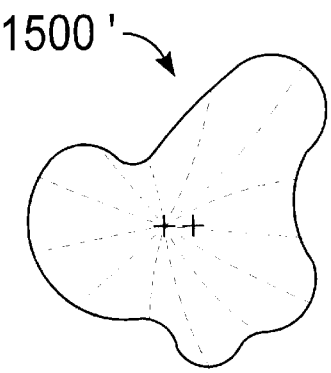
Figure 15D:
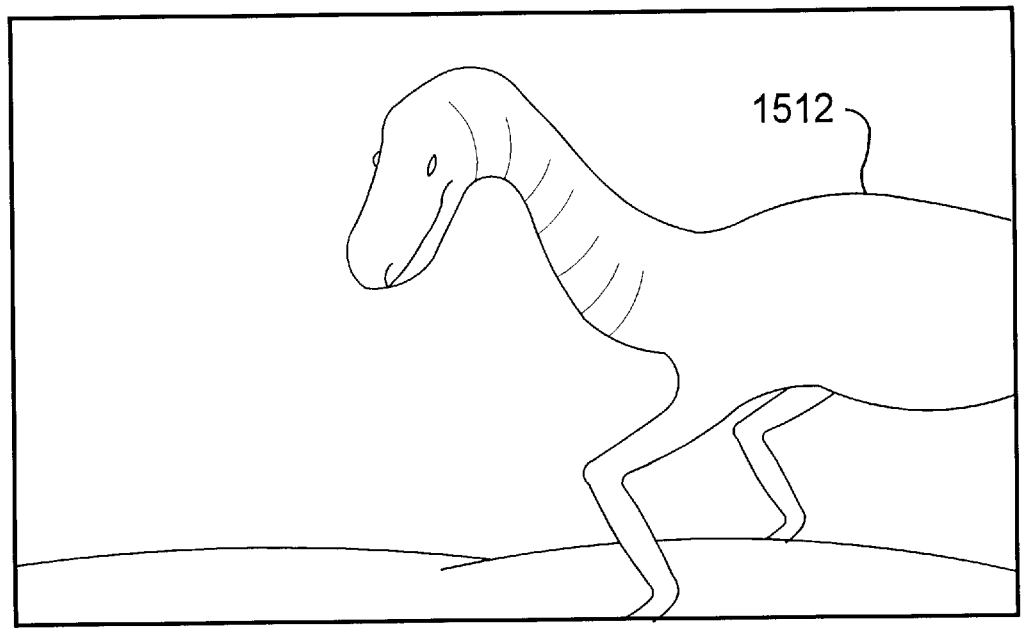
Figure 15E:
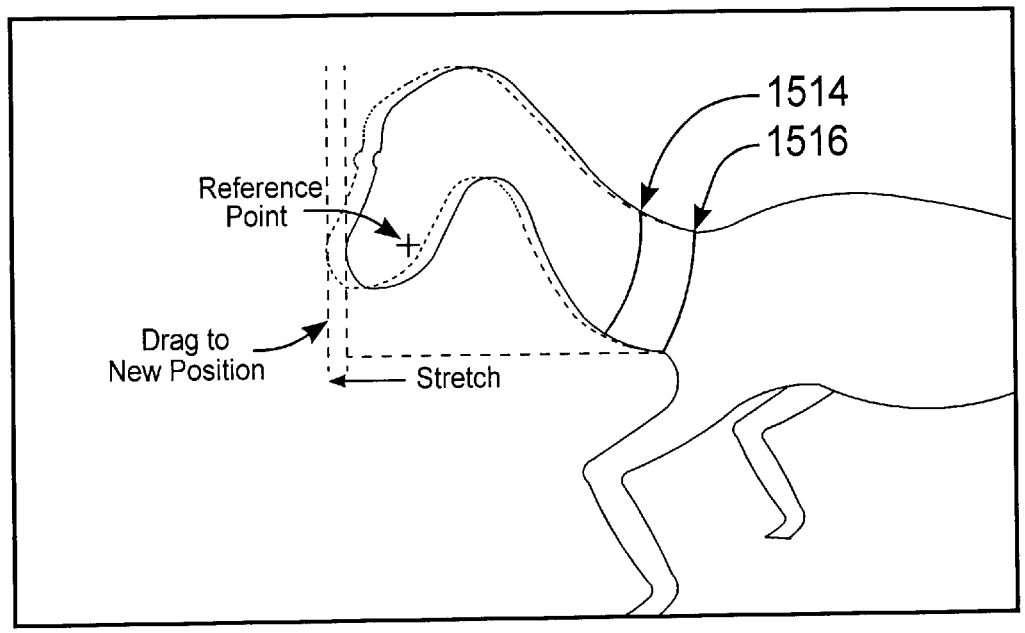

The Virtual Object function can be used in other ways as well. For example, when a section of an already defined object is re-defined, or rather, copied and edited, to only adjust the depth of that edited section. For purposes of this disclosure, a "defined object" includes, but is not limited to, drawn objects. Referring to FIG. 15E, the dinosaur is a defined object with a neck and head that bend around toward the viewer. In this case, it is desirable to apply a separate algorithm (e.g., a stretch algorithm) only to the neck and head portion of the dinosaur. This can be accomplished according to the present invention by copying the entire object, and then trimming it down to only the portion to which the algorithmic change is to be applied. The rest of the dinosaur, defined as a whole object, may have an entirely different algorithm or a positional change applied to it. This is the same as the example of FIGS. 9A and 9B, but in reverse.

"Reference To" Command:

This feature provides the ability to indicate a reference point or points in an image and assign that reference point or points to a selected object or group of objects so the object or objects will track the movement of the selected reference point. In the illustrated exemplary workstation 200, the Reference To feature is accessible via the Reference To switch in the Object Manager Toolbar 610 (FIG. 6).

According to the present invention, objects may be connected at their connecting reference points by a command that attaches the connecting points together. Once the connecting points have been established, the connected objects will remain at the same depth plane at the connecting points. One method of attaching objects together is to enable a function, either by softkey, or keyboard key, as the "reference point tag" function and then touching the points of the objects with the pen to the objects that need to be tagged. Once that action is done, those objects will remain referenced (connected) together at those points. In other words, if one object moves by having an algorithm applied, all connecting objects will move accordingly where they happen to be connected.

Figure 10:
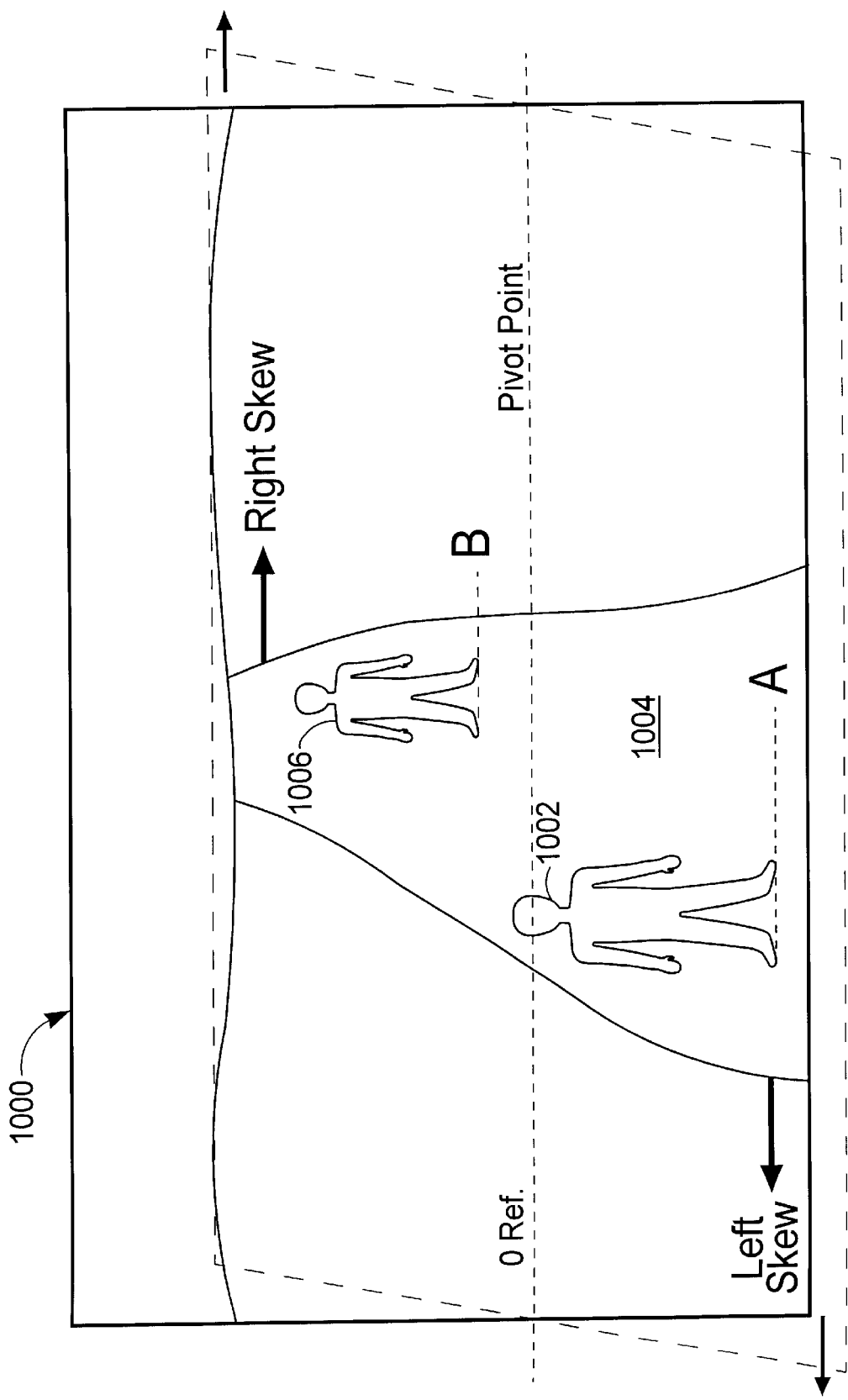
FIG. 10 illustrates the "Reference To" feature of the present invention.

Referring to FIG. 10, in an image 1000, a person 1002 stands in the foreground on a walk 1004 which runs into the background. Another person 1006 stands further back in the background. The walk 1004 requires a skew type algorithm to cause the depth effect of it running into the background but the persons 1002, 1006 do not require the skew effect. However, the persons 1002, 1006 do require their positions to be referenced at their feet (reference points A, B, respectively) to the skewed walk 1004 to reestablish their positions in depth.

An image processing method for converting two-dimensional images into three-dimensional images according to an embodiment of the present invention includes the steps of: applying a reference point to an image; and associating the reference point with a plurality of defined objects in the image such that when pixels of one of the defined objects are repositioned within the image, the plurality of defined objects remain connected together at the reference point.

"Tagging Multiple Objects to be Adjusted Simultaneously"

This feature provides the ability to tag objects so they can have separate depth algorithms applied and adjusted simultaneously. In the illustrated exemplary workstation 200, a Tag Points switch is provided in the Object Manager Toolbar 610 (FIG. 6).

As part of the Dimensionalization™ process, objects and subjects are individually defined so that appropriate depth values can be applied to each of them causing the reconstruction of what was a three-dimensional image. As part of this process, each of the defined objects and subjects may have different depth algorithms applied and in different amounts. Since each object or subject may require different depth algorithms to be applied, but yet have points that exist in the same depth plane, according to the present invention, each object can be tagged, or linked together, so that points of objects that are in the same depth plane stay "attached" even when different algorithms are applied to each of the objects.

Figure 11A:
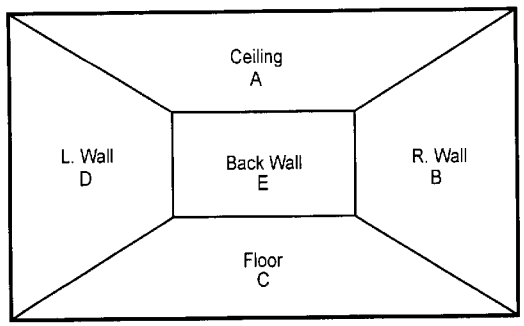
FIGS. 11A–11H illustrate the "Tagging Multiple Objects to be Adjusted Simultaneously" feature of the present invention.
Figure 11B:
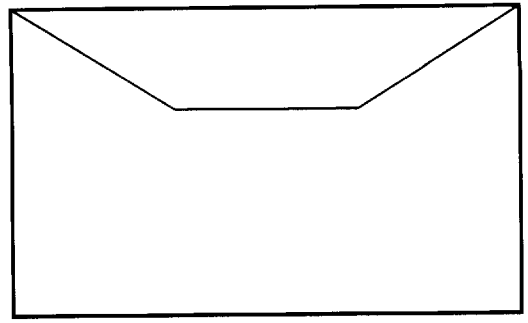
Figure 11C:
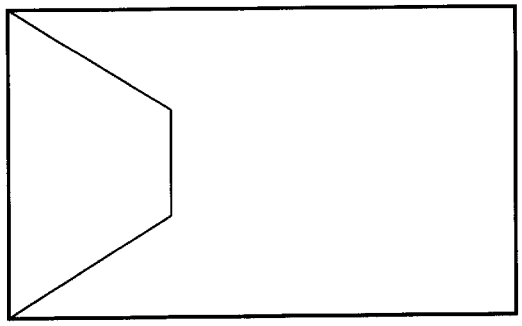
Figure 11D:
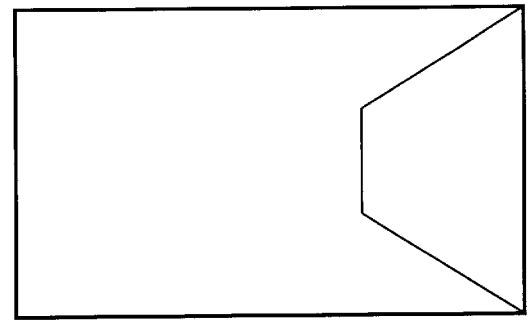
Figure 11E:
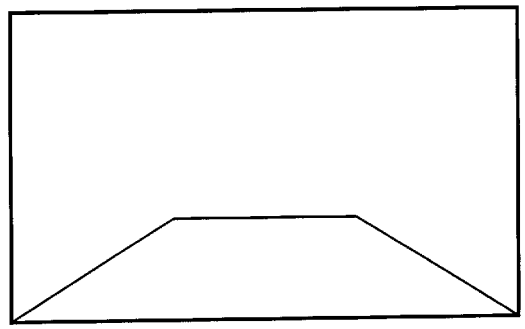
Figure 11F:
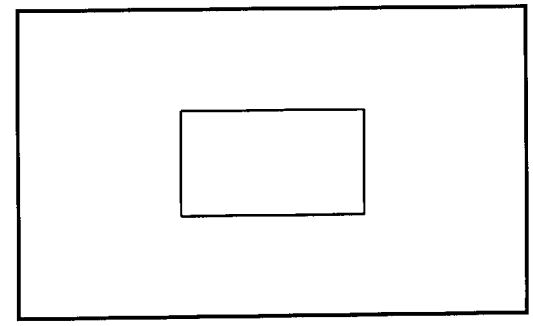
Figure 11G:
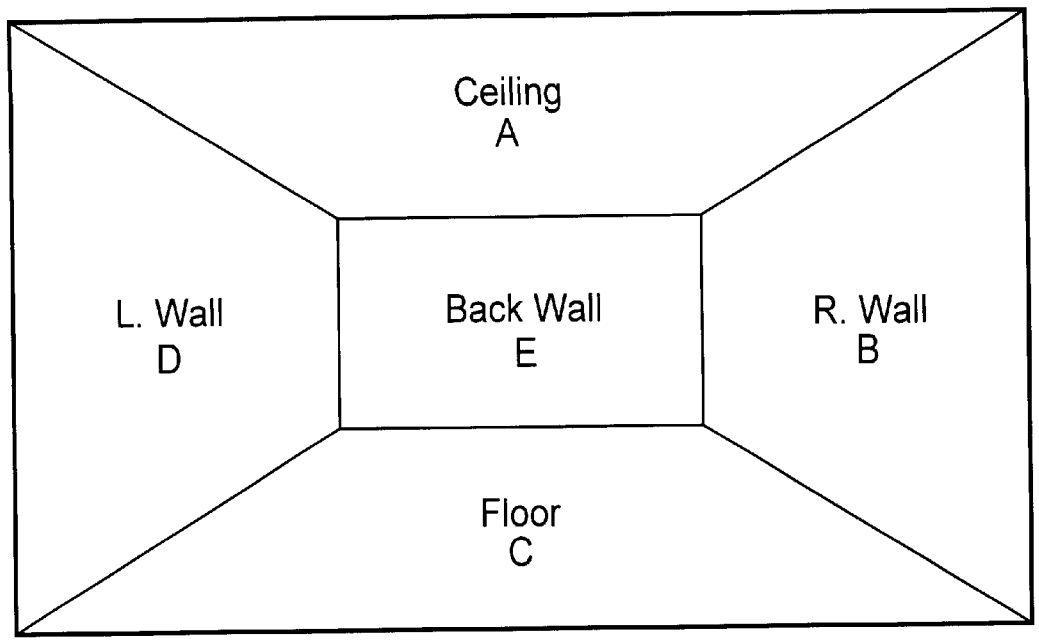
Figure 11H:
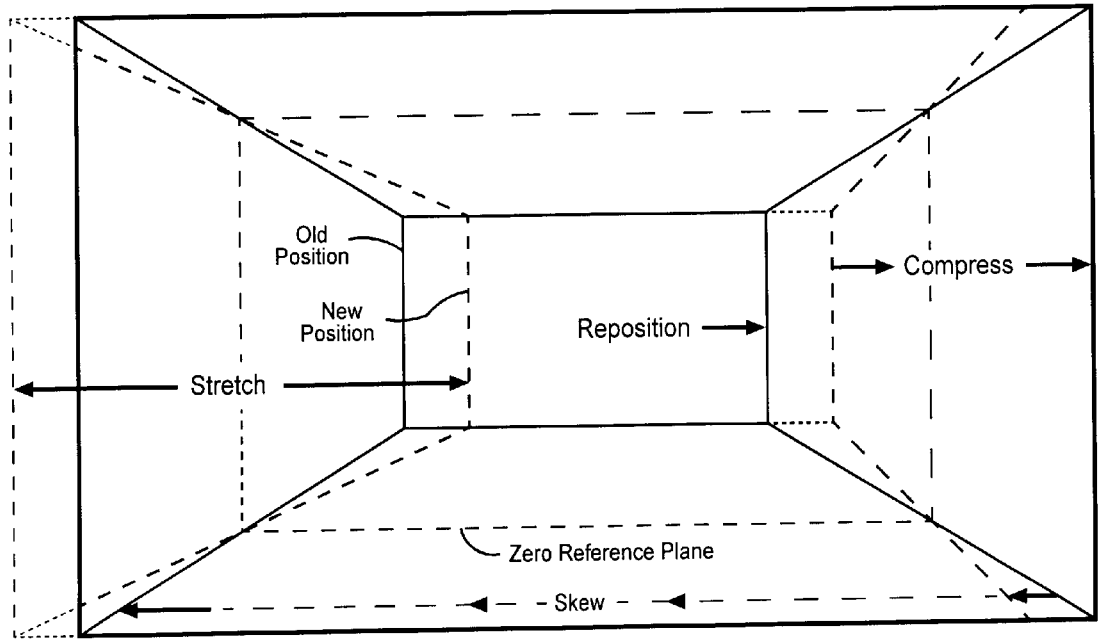

By way of example, FIG. 11A shows an image with a Ceiling A, Right Wall B, Floor C, Left Wall D and Back Wall E. FIGS. 11B–11F illustrated that each of the Ceiling A, Right Wall B, Floor C, Left Wall D and Back Wall E is an individually defined object. According to the present invention, these objects are tagged, or linked together, and shown again (enlarged) in FIG. 11G. Tagged or linked together as described above, the Ceiling A, Right Wall B, Floor C and Left Wall D are automatically repositioned by the processor/controller as shown in FIG. 11H when Back Wall E is repositioned to the right. By tagging, or rather numerically identifying each of the defined objects, each object can then remain isolated so that each separate algorithm may be applied. This is important as various objects within an image may be connected to others that happen to be in the same depth plane, yet still require different algorithms.

An image processing method for converting two-dimensional images into three-dimensional images according to an embodiment of the present invention includes the steps of: linking together a plurality of defined objects in an image; and linking together depth adjustment algorithms which are applied to the defined objects such that an adjustment to the depth adjustment algorithm applied to one of the defined objects automatically causes adjustments to be made to the depth adjustment algorithms applied to the other defined object(s).

"Object Drawing Expand/Contract"

This feature provides the ability to expand or contract an object drawing. In the illustrated exemplary workstation 200, a group of Expand/Contract switches 620 is provided in the Object Manager Toolbar 610 (FIG. 6). These switches allow left, right, top and/or bottom drawn object boundaries to be expanded or contracted as discussed below.

During the Dimensionalization™ process, it is frequently desirable to be able to quickly expand or contract a drawn object boundary. For example, this may be necessary to capture outside or inside pixels of an object to insure a pixel repeat of that object. Moreover, pathlines may be inadvertently drawn (or otherwise positioned) too close to a given object. If the object requires a reposition, the actual defined pathline of that object must be drawn such that it captures the pixels outside of that the object itself so it can pixel repeat the gap that will occur when that object moves. If a defined object pattern needs to expand, its pixels can, for example, be expanded outward towards the left or the right.

Figure 12:
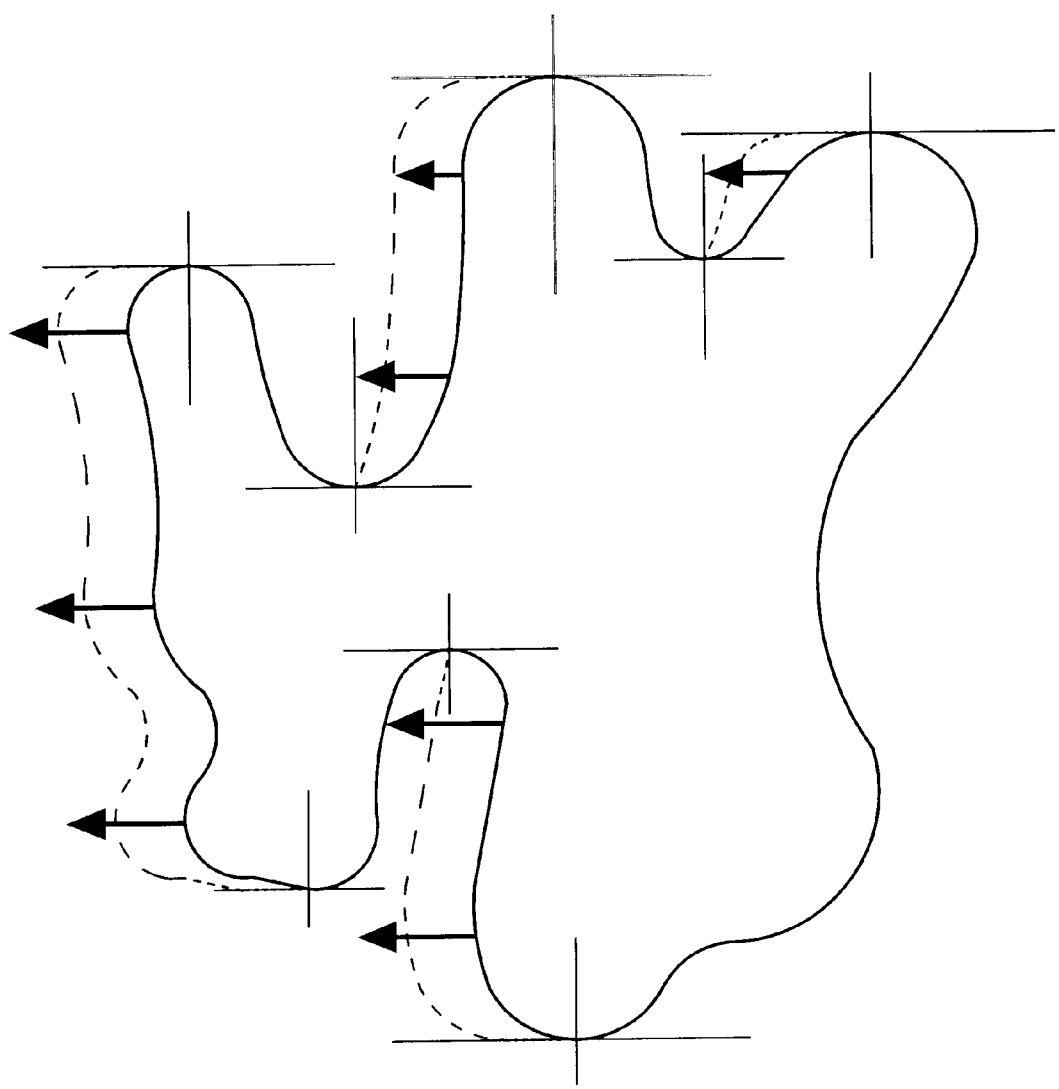
FIG. 12 illustrates the "Object Drawing Expand/Contract" feature of the present invention.

FIG. 12 shows a pathline of a defined object expanding towards the left to ensure that the pixels just outside that object are captured as to pixel repeat to cover up the gap of missing information that will occur by the repositioning of that selected object. In an exemplary preferred embodiment, expanding and contracting is prohibited for edges of a defined object pattern pathline that a user attempts to move such that they would overlap another edge boundary of the defined object. It should be understood that Object Expansion/Contraction can be applied to left, right, top and/or bottom drawn object boundaries even though FIG. 12 only illustrates a left boundary expansion. By way of example, an Object Contraction may be useful if a horizontal edge of a defined object needs to be trimmed away from the outside of the object. Defined Objects can also be expanded or contracted by an equal number of pixels in all directions.

An image processing system according to an embodiment of the present invention includes: an interactive user interface providing an object modifying tool configured to allow a user of the system to independently expand or contract a left, right, top and/or bottom boundary of a drawn object within an image. In a preferred embodiment, the drawn boundary object is computer generated employing an object recognition technique (rather than drawn by a human). In a preferred embodiment, the object modifying tool is configured to expand or contract the left, right, top and/or bottom boundary in a substantially uniform manner (e.g., one pixel at a time). In a preferred embodiment, the object drawing tool implements logic to prevent an edge boundary of the defined object from being repositioned such that it overlaps another edge boundary of the defined object.

"Object Drawing Add/Subtract"

This feature provides the ability to add or subtract to an object drawing. In the illustrated exemplary workstation 200, switches for implementing this feature are provided in the Object Manager Toolbar 610 (FIG. 6).

Figures 13A, 13B:
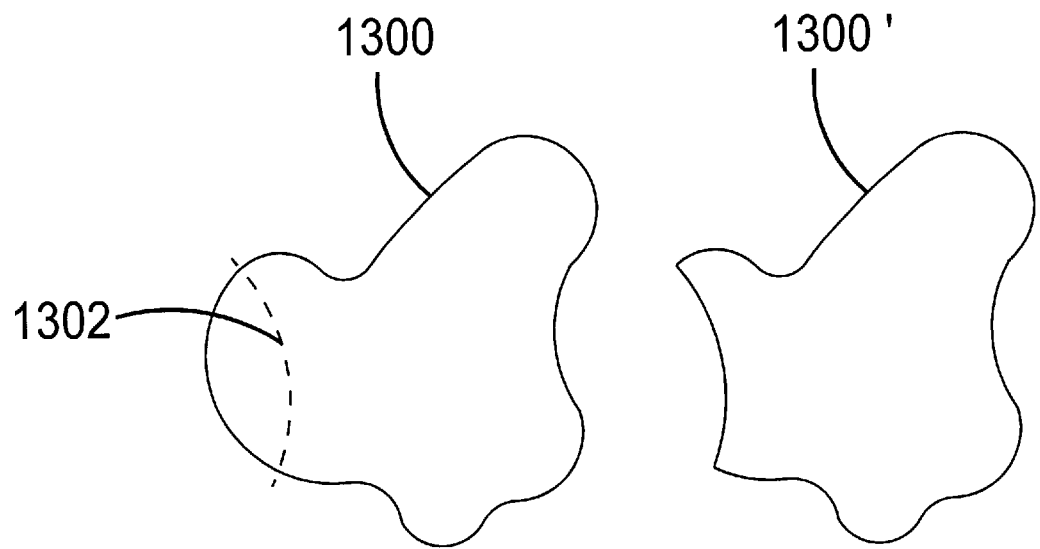
FIGS. 13A–13D illustrate the "Object Drawing Add/Subtract" feature of the present invention.
Figures 13C, 13D:
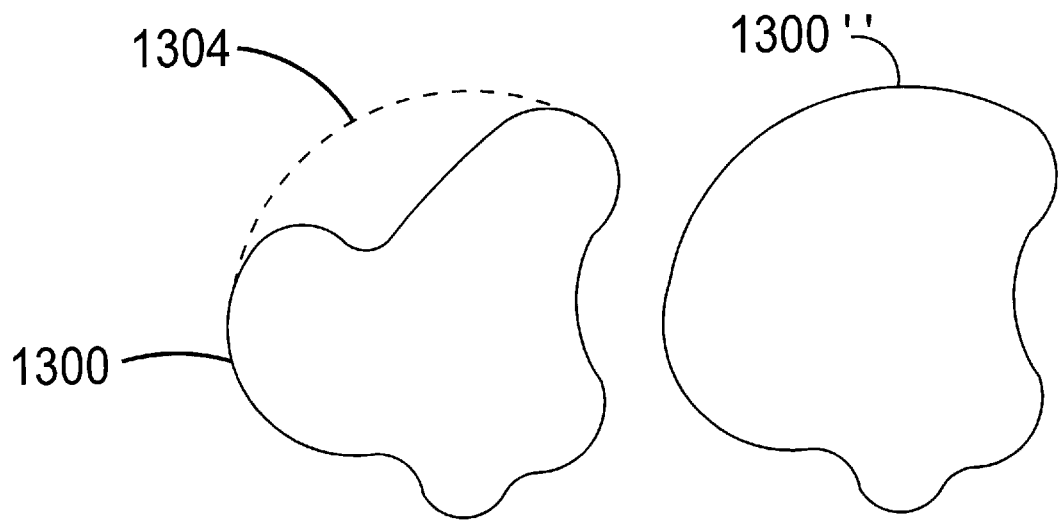

According to the present invention, a method is provided for adding or subtracting from a drawing without having to do a "wrap around" to connect the two ends of the new portion together. In other words, an exemplary preferred processor/controller is configured to allow a user of the workstation 200 to add or subtract from an object drawing by only having to draw the section that is to be added or subtracted which is much faster than conventional approaches. Referring to FIG. 13A, an object drawing 1300 is modified, or Subtracted from, by drawing a line 1302 resulting in a modified object drawing 1300' (FIG. 13B). Referring to FIG. 13C, the object drawing 1300 is modified, or Added to, by drawing a line 1304 resulting in a modified object drawing 1300" (FIG. 13D).

"Object Sizing" Functions:

This feature provides the ability to enlarge, or reduce the size of defined objects in real time. As part of the Dimensionalization™ process, multiple objects and subjects may change in size from one frame to another. This feature allows the operator to simply, with one adjustment, increase or decrease the size of the defined object outline in real time as the operator views the results in real time. In the illustrated exemplary workstation 200, switches for implementing this feature are provided in the Object Manager Toolbar 610 (FIG. 6) and in the Object Drawing Toolbar 612 (FIG. 7).

During the processing of a large number of frames, the Dimensionalization™ process facilitates rapid copying of objects to any number of frames. Although some objects may closely exist in numerous frames over time, it is likely that those objects will change position and size. The Object Sizing function allows the operator to easily adjust the size and position of a defined object or object pathline in real time to conform to the object in the picture that has changed its size or position from one frame to the next. This saves a considerable amount of time by not having to redraw the defined object outline for each and every frame.

An image processing system according to an embodiment of the present invention includes: an interactive user interface providing an object sizing tool and configured to allow a user of the system to variably increase and/or decrease a size of a drawn object boundary within an image and to view changes to the drawn object boundary. In a preferred embodiment, the interactive user interface is configured to allow the user to view changes to the drawn object boundary in real time. In a preferred embodiment, the drawn boundary object is computer generated employing an object recognition technique (rather than drawn by a human). In a preferred embodiment, the size of the drawn object boundary is proportionally increased or decreased. In a preferred embodiment, the size of the drawn object boundary is increased or decreased by a uniform number of pixels away from its original boundary. In a preferred embodiment, the interactive user interface is also configured to allow the user to convert two-dimensional images into three-dimensional images. In a preferred embodiment, the interactive user interface is also configured to allow the user to color correct images.

"Object Dividing" Function (Group Ungroup)

This feature provides the ability to divide a previously defined object into multiple objects, or combine different defined objects into a single object. For example, as part of the Dimensionalization™ process, it may be necessary to divide a defined object into two or more separate objects. This function allows the operator to divide a defined object or subject into multiple objects which then may have completely separate depth algorithms applied. In the illustrated exemplary workstation 200, Group and Ungroup switches for implementing this feature are provided in the Object Manager Toolbar 610 (FIG. 6).

An image processing system according to an embodiment of the present invention includes: an interactive user interface providing an object dividing tool configured to allow a user of the system to divide a defined object within an image into a plurality of other objects and/or combine a plurality of defined objects within the image into a single object.

"Real Time Defined Object Viewing" Function:

This feature provides the ability to view selected outlined objects as images play in real time. As part of the Dimensionalization™ process, and prior to the point at which depth algorithms may be applied, it is advantageous for the operator to be able to view the images with the defined object outlines as the images play in real time. This feature allows the operator to view in real time the results of depth adjustments to an object as the adjustments are being made. A method for converting two-dimensional images into three-dimensional images according to an embodiment of the present invention provides that outlines of multiple defined objects in an image are viewed in real time.

"Auto Calculate" Function:

This feature provides the ability to select a defined object or objects of one frame, and select an object or objects of another frame, and automatically calculate the in-between differences (e.g., in depth information, size and/or position) of the selected object or objects between the two frames.

As part of the Dimensionalization™ process, there may be objects in a scene that change in either position or size over time, which is in essence, a number of frames. The Auto Calculate feature of the Dimensionalization™ workstation 200 allows the user to mark the objects of one frame and the same objects in later frames, as time has passed, and auto-calculate the in-between differences. By doing so, the speed of the Dimensionalization™ process is increased tremendously. The Auto Calculate function is versatile and provides for the calculation of in-between changes of the objects or subjects that are linear (FIG. 14C), non-linear (FIG. 14D) or determined according to a custom curve (FIG. 14E).

By way of example, the Auto Define feature can be employed for a scene where an object starts out in the foreground and, over several seconds, moves toward the background. Rather than applying a separate algorithm to each individual frame, the Auto Define feature can be employed to instead apply a depth to the object in the frame where the object is in the foreground and then apply another depth to the same object where it has completed its transition to the background, and then Auto Calculate all of the in-between values.

Figure 14A:
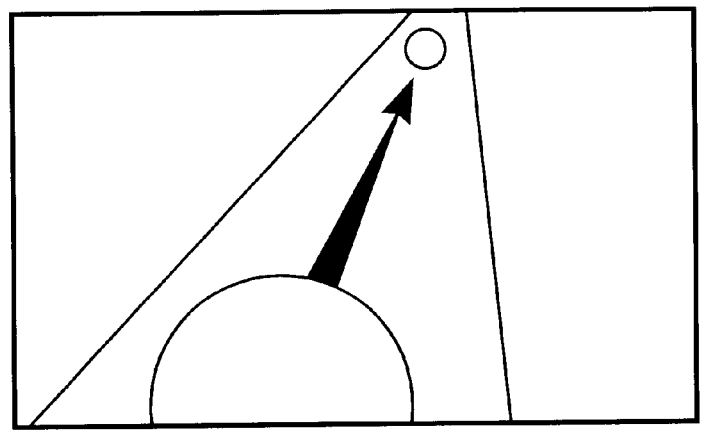
FIGS. 14A–14E illustrate the "Auto Calculate" feature of the present invention.
Figure 14B:
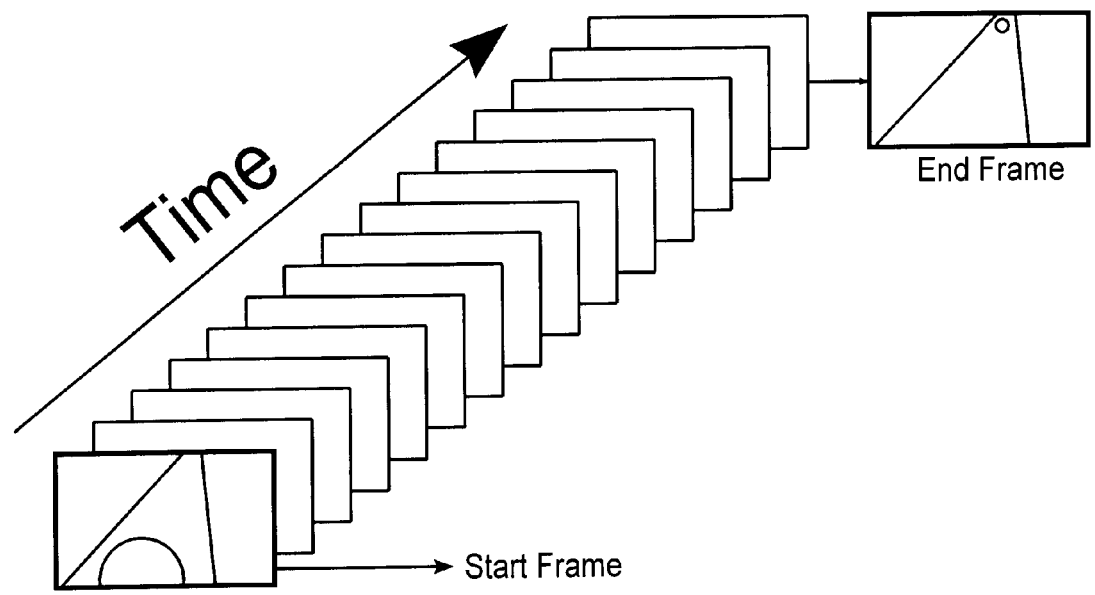
Figure 14C:
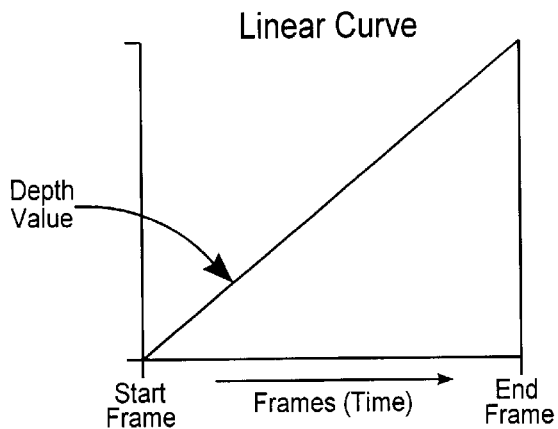
Figure 14D:
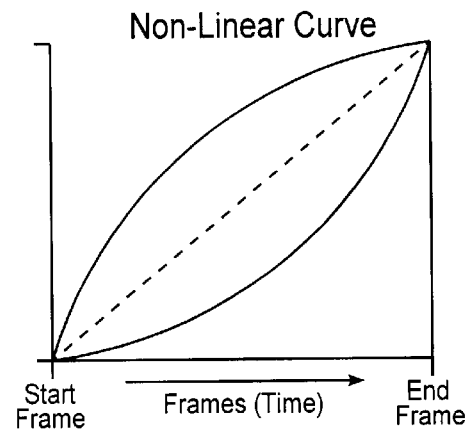
Figure 14E:
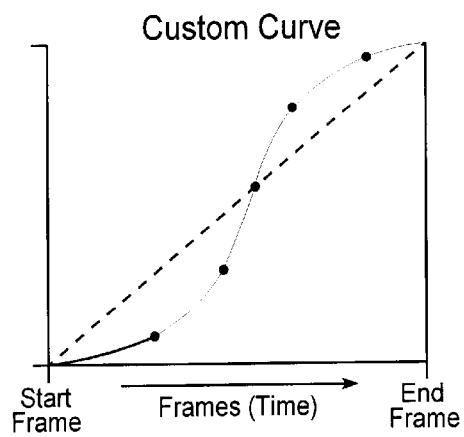

FIGS. 14A and 14B represent a series of images showing a ball rolling from a foreground position towards the background. FIG. 14A shows both the start and end position of the ball. Although each of the progressive frames may contain different shaped defined objects, the in-between depth values from start to finish can be calculated and applied to each of the corresponding objects within those frames employing the Auto Calculate feature.

An image processing system for converting two-dimensional images into three-dimensional images according to an embodiment of the present invention includes: an interactive user interface configured to allow a user of the system to select one or more defined objects which are in both a start image and a stop image and to employ depth information associated with the selected objects to automatically determine depth information for a sequence of images between the start image and the stop image. In a preferred embodiment, the interactive user interface is configured to allow the user to automatically apply the depth information to the sequence of images.

An image processing system for converting two-dimensional images into three-dimensional images according to an embodiment of the present invention includes: an interactive user interface configured to allow a user of the system to select one or more defined objects which are in both a start image and a stop image and to employ size information associated with the selected objects to automatically determine size information for a sequence of images between the start image and the stop image. In a preferred embodiment, the interactive user interface is configured to allow the user to automatically apply the size information to the sequence of images.

An image processing system for converting two-dimensional images into three-dimensional images according to an embodiment of the present invention includes: an interactive user interface configured to allow a user of the system to select one or more defined objects which are in both a start image and a stop image and to employ position information associated with the selected objects to automatically determine position information for a sequence of images between the start image and the stop image. In a preferred embodiment, the interactive user interface is configured to allow the user to automatically apply the position information to the sequence of images.

"Grab & Bend" Function:

This feature provides the ability to grab a point or points of a selected object with a drawing pen and drag the selected point(s) causing the selected object to bend or stretch into a new position in real time while viewing the object in 3D. The Grab & Bend feature makes the object definition process faster by allowing a user of the Dimensionalization™ workstation 200 to simply grab a point on a defined object and stretch it into its new position in real time. In one embodiment, the user selects points of an object from which the object is bent or stretched by essentially pulling it with a user input mechanism such as the tablet pen. For example, the user marks two points on a circle and grabs the object anywhere within those two points and stretches the object as desired. In another embodiment, the user marks points within an object to define its bending points with the tablet pen and then grabs any place within that object and bends it into place while watching the resulting 3D effect of that bend in real time.

Another method according to the present invention for adding depth to defined objects is to mark a reference point within the object with the drawing tablet pen, select the closest algorithm, and then grab that point and bend it into a desired depth position while watching the 3D effect at the same time. FIG. 15A shows a defined object shape 1500 with a reference point at an original position 1502 defined by the operator. FIG. 15B shows an example where the operator has dragged, e.g., with the drawing pen, the object 1500 by its reference point to a new position 1504 causing the object to stretch, pivoting by its boundaries, into object 1500' as shown in FIG. 15C.

Another example is described below with reference to FIG. 15D which is an image 1510 of a dinosaur 1512 with the neck and head of the dinosaur shown curving toward the viewer. With the Grab & Bend feature, the user of the Dimensionalization™ workstation 200 can rapidly select a boundary for the algorithm to "pivot" about and then bend the object into a depth position that looks realistic while directly viewing the feedback of the 3D effect of that bend in real time. Referring to FIG. 15E, variable width transition borders 1514, 1516 ("Variable Width Lines" feature) are used and the object is stretched into its new position in the resulting image 1510'. An advantage of drawing a variable width border is that the depth will smoothly transition from one side of the transition border to the other, which is often preferable to having a hard edge depth transition. Multiple transition borders can be used, or single borders with no transition can be used.

Another method according to the present invention for quickly grabbing and bending an object into place while viewing is to mark reference points that connect together linearly or by curved lines, and then mark a grabbing reference point with the drawing pen and bend that object by its reference point into a new depth position while viewing the 3D effect in real time.

An image processing system for converting two-dimensional images into three-dimensional images according to an embodiment of the present invention includes: an interactive user interface configured to allow a user of the system to select a portion of a defined object in an image to which a depth adjustment algorithm is being applied, to employ one or more user input mechanisms of the system to deform the selected portion of the defined object, and to view a three-dimensional image which changes as the defined object is modified.

"Grab, Tag, & Bend" Function:

This feature provides the ability to select and tag points of a selected object or objects with a drawing pen and drag the selected tagged points causing the selected object or objects to bend or stretch into a new position in real time while viewing the said object or objects in real time. This feature also allows the user to simply tab multiple points of selected objects with the drawing pen and then bend or stretch each of the tagged objects at one time in real time.

"External Object Data" Function:

This feature provides the ability to accept external dimensional data from an external source for the purpose of isolating objects. An advantage of this feature is that it provides a mechanism for rapidly and automatically providing object definition information. As a result, the time spent defining objects is shortened thereby accelerating the object definition and depth application process. The external data may come from an alternate 3D source camera.

"External Depth Data" Function:

This feature provides the ability to accept external dimensional data from an external source for the purpose of reinsertion of depth values. An advantage of this feature is that it provides a mechanism for rapidly and automatically providing object depth information. As a result, steps of the Dimensionalization™ process whereby depth is added are drastically shortened speeding up the depth application process. The external data may also come from an alternate 3D source camera.

"Variable Width Lines"

This feature provides the ability to draw, or apply a variable width line that contains an area of pixels with which an algorithm (that may selected or pre-selected) or information (such as color correction information) is associated. In the illustrated exemplary workstation 200, switches for implementing this feature are provided in the Object Drawing Toolbar 612 (FIG. 7).

In many cases objects may have rounded edges that taper off, in depth. The Variable Width Lines feature of the present invention provides the user of the Dimensionalization™ workstation 200 with the ability to draw around certain objects or subjects within an image with lines that are variable in width. The width of these lines can be adjusted, in real time, as the lines are being drawn, or after the lines have been drawn. The depth algorithms contained within (and/or other information associated with) these variable width lines can be pre-selected, applied, or changed afterwards.

Figure 16A:
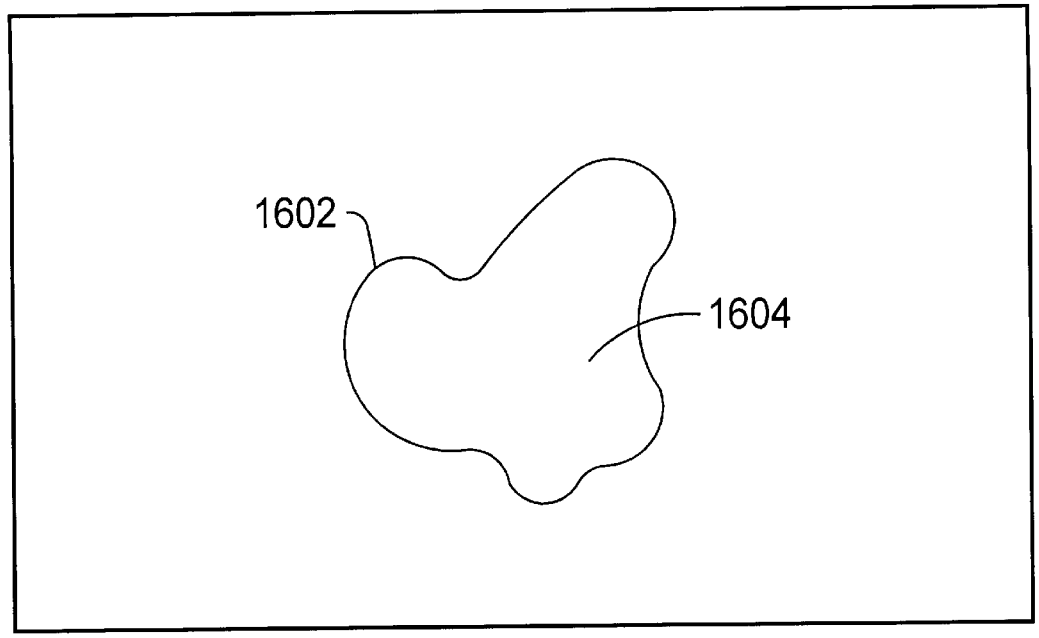
FIGS. 16A–16C illustrate the "Variable Width Lines" feature of the present invention.
Figure 16B:
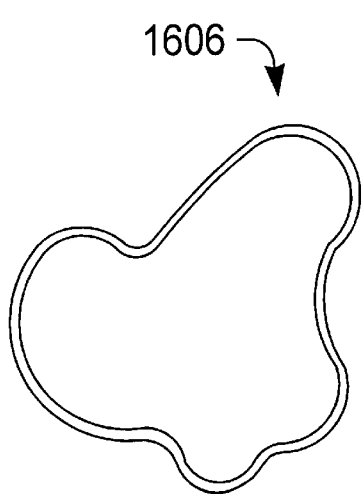
Figure 16C:
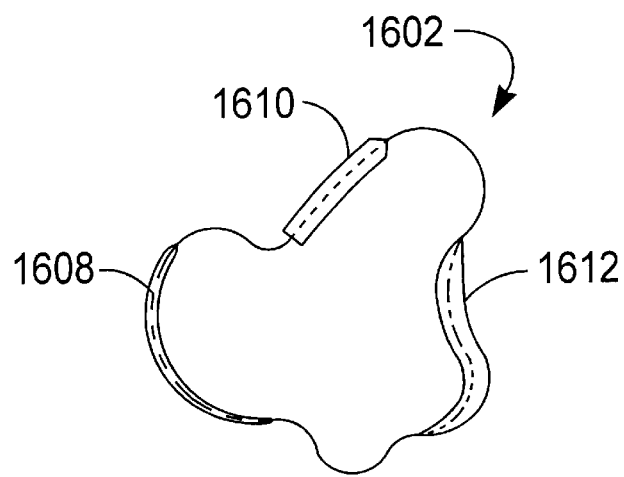

The Variable Width Lines feature enables the user to smooth out hard edges by transitioning the depth values (or color correction information) across the "variable width line" from one side (edge) of the variable width line to its opposite side (edge). Referring to FIG. 16A, an image 1600 includes a drawn line 1602 bordering an object 1604. According to the present invention, and referring to FIG. 16B, a fixed variable width depth transition (or other information transition) can be applied via a fixed variable width line 1606 (FIG. 16B). Alternatively, and referring to FIG. 16C, a plurality of variable width depth (or other information) transitions can be applied to portions of the drawn line 1602 as shown by variable width lines 1608, 1610, 1612.

Figure 17A:
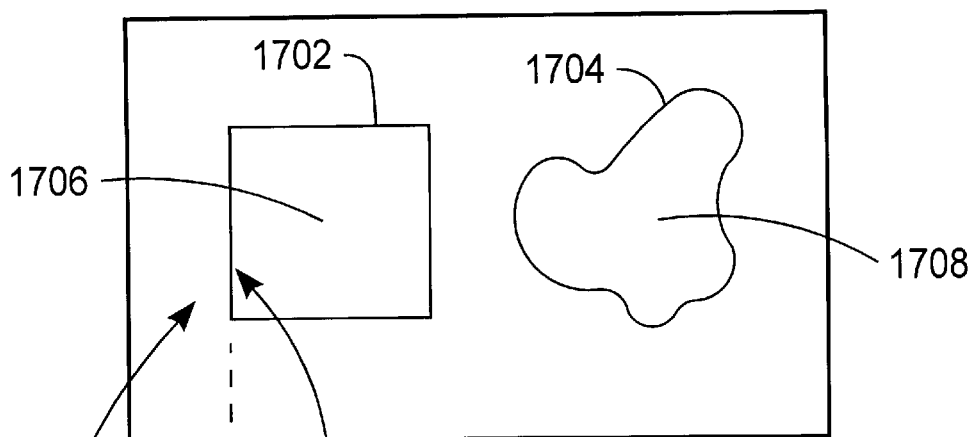
FIGS. 17A–17D illustrate how the depth value (or other information) transition can be controlled and referenced to the variable width line according to the present invention.
Figure 17B:
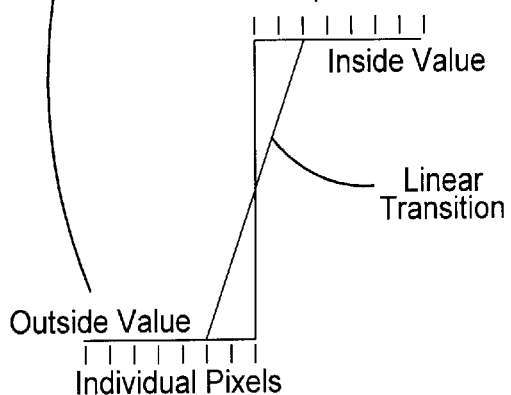
Figure 17C:
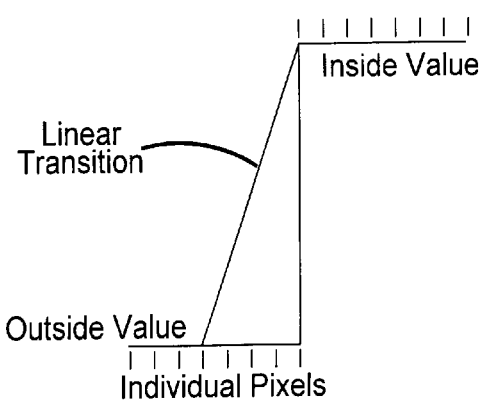
Figure 17D:
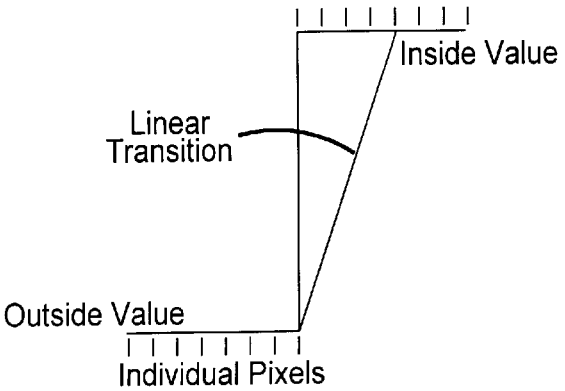

The Variable Width Lines feature also enables the user to control detailed aspects of how the depth value (or other information) transition is to be applied. FIG. 17A shows an image 1700 with drawn boundaries 1702, 1704 for objects 1706, 1708, respectively. According to the present invention, the user can control how a depth value (or other information) transition is referenced to the variable width line. For example, a linear transition can occur equally on both sides of the drawn boundary 1702 (FIG. 17B). Alternatively, the transition occurs starting at the drawn boundary 1702 and moves outward away from the object 1706 (FIG. 17C) or moves inward into the object 1706 (FIG. 17D). It should be understood that different percentages of a transition than those illustrated in FIGS. 17B–17D can be applied on either side of a drawn boundary.

Figure 18A:
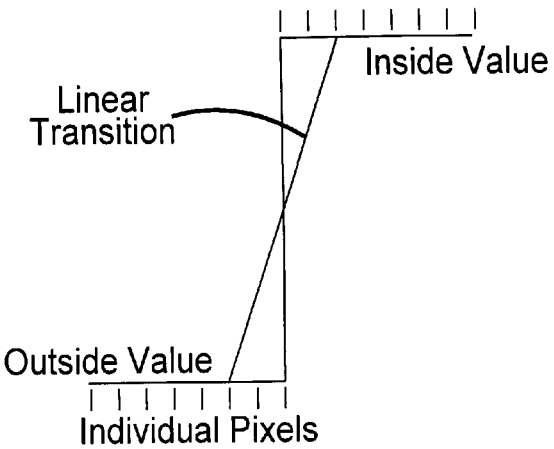
FIGS. 18A–18C illustrate how the nature of the depth value (or other information) transition for a variable width line can be controlled according to the present invention.
Figure 18B:
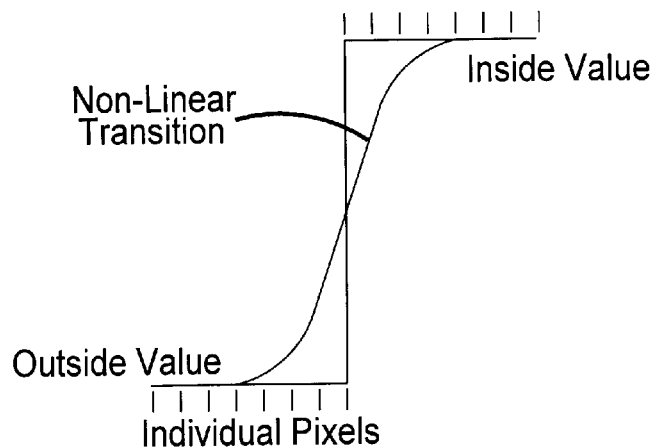
Figure 18C:
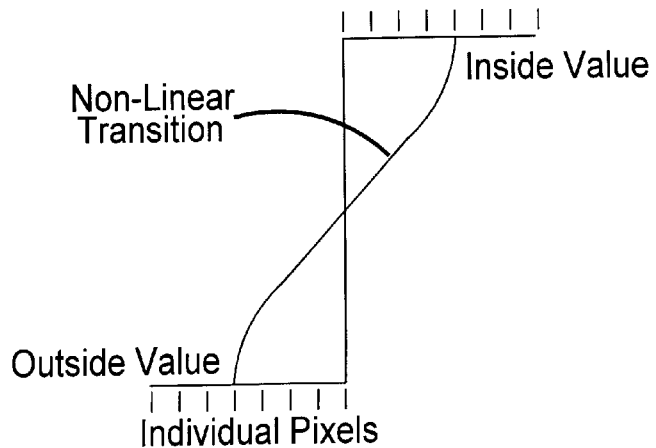

The nature of the depth value (or other information) transition can also be controlled with precision. For example, an algorithm applied to effect the transition can be linear (FIG. 18A), non-linear with a gradual transition (FIG. 18B) or non-linear with a more pronounced transition (FIG. 18C). Transition variations other than those specifically illustrated are also within the scope of the present invention.

An image processing system for converting two-dimensional images into three-dimensional images according to an exemplary embodiment of the present invention includes: an interactive user interface configured to allow a user of the system to draw a variable width line on an image and to associate information with an area of pixels contained within the variable width line. In a preferred embodiment, the interactive user interface is configured to allow the user to change the variable width line while viewing an image which changes depending upon changes made to the variable width line. In a preferred embodiment, the interactive user interface is configured to allow the user to convert two-dimensional images into three-dimensional images, and the information comprises depth information. In a preferred embodiment, this depth information changes in value across the variable width line. In a preferred embodiment, this depth value transitions from an outside boundary of the variable width line to an inside boundary of the variable width line. In another preferred embodiment, the interactive user interface is configured to allow the user to color correct images, and the information comprises color correction information.

"Magnification Window" Feature

This feature provides the user with the ability to enable and control a magnified sub-window for more accurate drawing. As discussed below, the Magnification Window feature allows the user of the Dimensionalization™ workstation 200 to see the full width of the entire image while at the same time be able to draw accurately. In the illustrated exemplary workstation 200, a Mag Window switch for implementing this feature is provided in the Dimensionalization™ Toolbar 608 (FIG. 6).

Figure 9C:
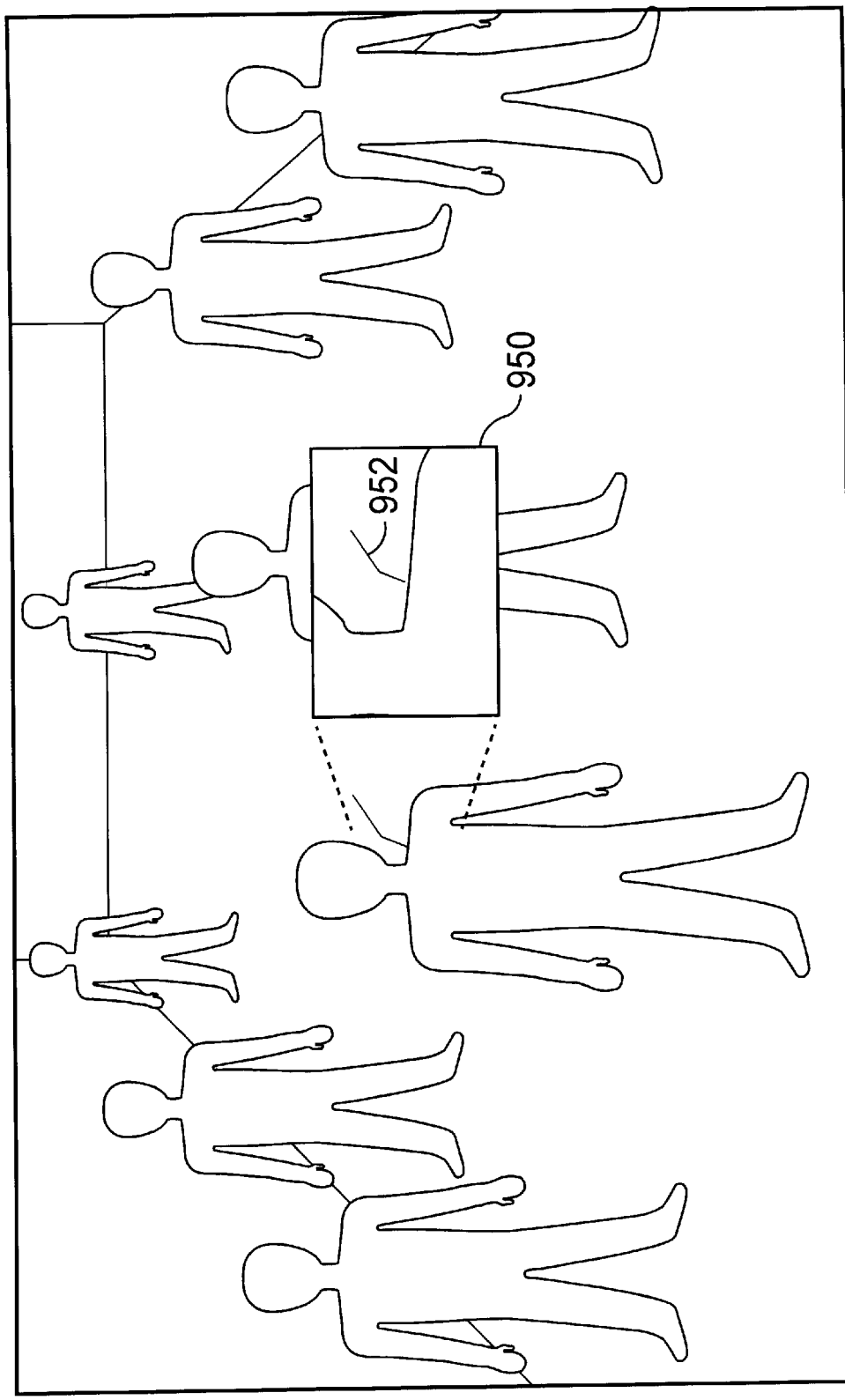
FIG. 9C illustrates the "Magnification Window" feature of the present invention.

In order to draw accurately around objects, it is helpful and often necessary to have a blow up of the area being drawn. The Magnified Window feature allows this to occur while simultaneously providing a full width of the entire image. The foregoing are accomplished by providing a viewing a mode whereby a sub-window appears to the left or right side of the drawing. By way of example, and referring to FIG. 9C, a sub-window 950 within the image 900' contains a magnification of the section being drawn. In a preferred embodiment, as the operator draws around the object on a full width image, the Mag Window shifts up, down, left or right accordingly, as the drawing cursor moves towards one of the four edges of the image where it would otherwise be cut off. The image within the Mag Window is automatically positioned to track to keep the drawing cursor 952 in the center of the Mag Window.

An image processing method for converting two-dimensional images into three-dimensional images according to an embodiment of the present invention includes the step of: providing an interactive user interface configured to allow a user to initiate and control a presentation of a magnified portion of an image inside a sub-window within the image while drawing outlines of objects in the image.

"Real Time Depth Adjustment"

This feature provides the ability to mark a reference point within an object causing the selection of that image, and adjusting the amount of depth algorithm for that object in real time while viewing the 3D result of that image on a 3D display.

In order to speed up the Dimensionalization™ process, it is advantageous to mark a reference point within a defined object, and having assigned a depth algorithm, adjust the amount of depth of that object while viewing the results in real time. As an example, a particular object may be selected by touching the pen within the object and then adjusting the amount of depth plus or minus while the results can be visually seen in 3D changing in real time. Once the appropriate amount of depth is achieved, the operator stops making further adjustment.

An image processing method for converting two-dimensional images into three-dimensional images according to an exemplary embodiment of the present invention includes the step of: adjusting a depth algorithm that is applied to an object in one of a stereoscopic pair of images for a three-dimensional image while viewing results of applied changes to the three-dimensional image.

"Real Time Depth Shaping"

This feature provides the ability to select an object within an image and adjust the shape of a depth algorithm for that object in real time while viewing the 3D result of that image on a 3D display. The Real Time Depth Shaping feature also functions to allow the user to adjust the shape of a depth algorithm that gets assigned to defined objects. It is essential, for speed, to be able to view the results of the shape being adjusted in real time.

An image processing method for converting two-dimensional images into three-dimensional images according to an exemplary embodiment of the present invention includes the step of: adjusting a depth algorithm that is applied to an object in one of a stereoscopic pair of images for a three-dimensional image while viewing the three-dimensional image in real time, wherein the step of adjusting a depth algorithm includes adjusting a shape parameter of the depth algorithm.

"Real Time Symmetry Adjustment"

This feature provides the ability to select a reference point within an object causing a reference point to occur within that image, and adjusting the symmetry of the depth algorithm for that object by pivoting by the selected reference point while viewing the 3D result of that image on a 3D display. The Real Time Symmetry Adjustment feature allows the user to simply mark a reference point anywhere within a defined object, and having assigned a depth algorithm, adjust the symmetry of the depth algorithm that has been selected for that object while viewing the results in real time. As an example, one may select with the pen, a point within an object and then cause the shape, or depth of the object to be non-symmetrical.

This feature also provides the ability to select a reference point within an object causing a reference point to occur within that image, and adjusting the symmetry of the depth algorithm for that object by moving, or sliding the selected reference point across the said object in real time, and simultaneously viewing the 3D result of that image on a 3D display. According to the present invention, this feature allows the user to grab a point of reference within an object, e.g., with a pen, and stretch or bend the depth algorithm into the desired 3D effect while viewing the 3D results in real time.

Figure 19A:
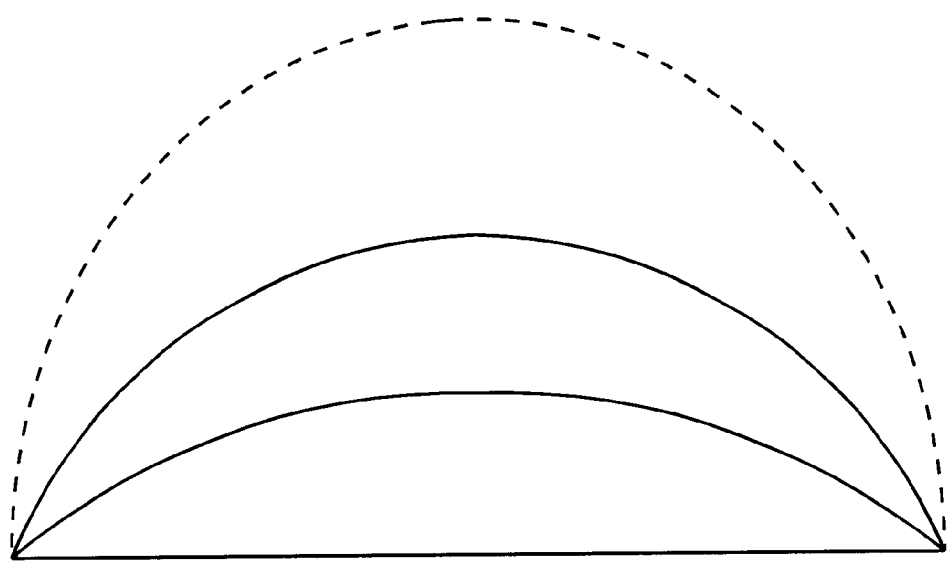
FIGS. 19A and 19B conceptually illustrate Gain and Symmetry adjustments, respectively, which can be made to object rendering algorithms according to the present invention.
Figure 19B:
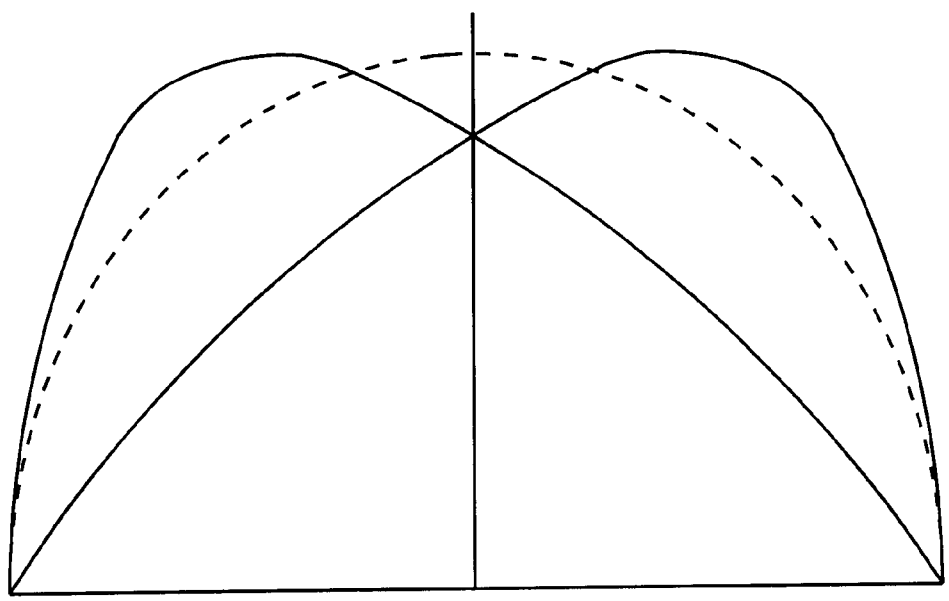

Symmetry adjustments such as illustrated in FIG. 19B also provide the user with an interactive tool for effecting Gain adjustments such as illustrated in FIG. 19A. The illustrated Dimensionalization™ Toolbar 608 (FIG. 6) also includes an object viewer portion which provides cross-sectional profile views of the current state of an object normal to the x-axis and y-axis for aiding the operator in arriving at a desired object shape.

An image processing method for converting two-dimensional images into three-dimensional images according to an exemplary embodiment of the present invention includes the step of: adjusting a depth algorithm that is applied to an object in one of a stereoscopic pair of images for a three-dimensional image while viewing the three-dimensional image in real time, wherein the step of adjusting a depth algorithm includes adjusting a symmetry parameter of the depth algorithm.

"Real Time Squaring Adjustment"

This feature provides the ability to select a reference point within an object causing a reference point to occur within that image, and adjusting the squaring of a depth algorithm in real time while viewing the 3D result of that image. This feature allows the user to quickly adjust the squaring of an object's depth algorithm. For example, if an object has a spherical algorithm assigned to it, adjusting the squaring in a positive direction would cause the algorithm to conform its original circle shape, into a square shape, as shown in FIG. 20A. If the squaring adjusts in the negative direction, the algorithm would approach a shape as demonstrated in FIG. 20C.

Figure 20B:
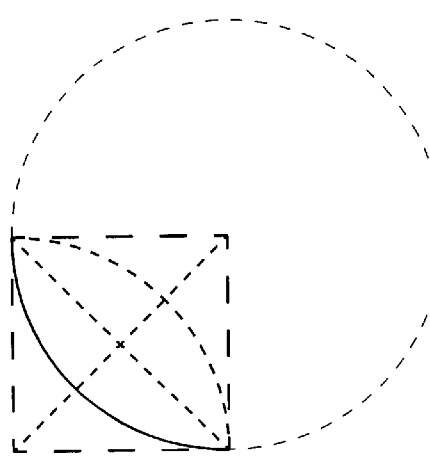
FIGS. 20A–20D illustrate the "Real Time Squaring Adjustment" feature of the present invention.
Figure 20D:
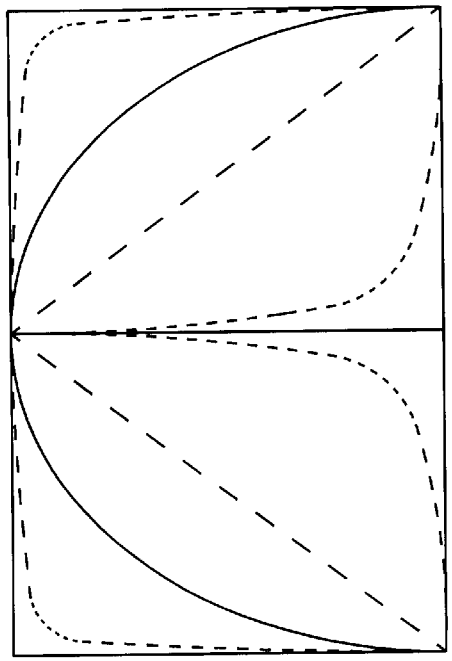
Figure 20A:
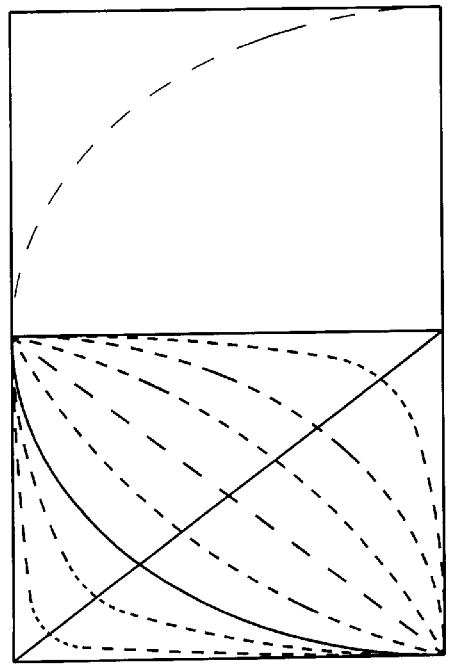
Figure 20C:
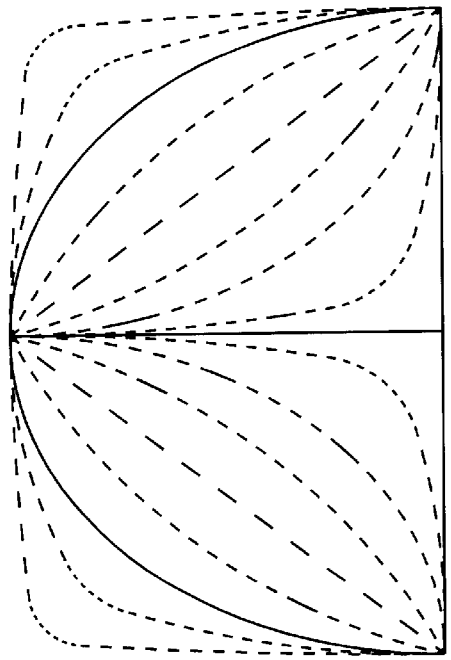

If a spherical shape of an object is required, the depth algorithm in the form of a circle is used, as shown in FIGS. 20A and 20B. FIG. 20B shows how the algorithm is made of one half of a circle. The left half of FIG. 20A shows what the effect will be when the squaring function is applied in the positive or negative direction. This effect is only shown on the left side so that it can be seen against the actual circle, in the right half. Referring to FIG. 20C, two examples of level increases of the squaring function are shown. Additionally, there are also six levels in the negative direction. The squaring function, in the positive direction essentially "morphs" the circle towards a square in the positive direction. In the negative direction, the circle morphs towards a triangle waveform, or line, and then through to the inverse of a circle. FIG. 20C shows some examples of what happens when the squaring function is applied symmetrically in the positive and negative directions. FIG. 20D shows a more simplified version of each of the waveform transitions. FIG. 20C just shows more of them.

The algorithm starts off with the circle, as the default. This results in a smooth spherical shape to a very round object. But if the object is not perfectly round, the algorithm can be adjusted to conform to the depth that the object wants to be. Another way to help visualize this is to imagine as if the line on the bottom of FIG. 20D is the monitor. The depth lines shown are coming out of the monitor. If imagining that those lines are coming out of the monitor, it can be seen that when the circle fall towards a line, or triangle, the object would appear as a wedge. If the circle is seen changing near to a square, the object would be perceived as pushed out except towards the edges. If the symmetry is adjusted, it will essentially bend the algorithm to the left or to the right. In a preferred embodiment, squaring and symmetry are independent of gain. Gain is the same as the amount of depth applied. The amount of depth is probably the most used function by the Dimensionalist™.

An image processing method for converting two-dimensional images into three-dimensional images according to an exemplary embodiment of the present invention includes the step of: adjusting a depth algorithm that is applied to an object in one of a stereoscopic pair of images for a three-dimensional image while viewing the three-dimensional image in real time, wherein the step of adjusting a depth algorithm includes adjusting a squaring parameter of the depth algorithm.

"Repeat Pixel"

This feature provides the ability to repeat pixels wherever positional depth algorithms cause an object to separate away form its original location whereby a gap of missing pixels would otherwise result.

When various depth values are assigned to defined objects, gaps may occur on one side of the objects where repositioning has taken place. The gap may be caused by any one of the depth algorithms. It is essential that this missing information be filled-in by repeating the pixels immediately adjacent to the object itself that has moved across the gap of missing information. According to the present invention, this automatic repeating of pixels occurs with any and/or all algorithms, wherever a gap of missing information occurs.

An image processing method for converting two-dimensional images into three-dimensional images according to an embodiment of the present invention includes the steps of: employing a depth adjustment algorithm to reposition pixels of a defined object within an image; and employing retained pixel information to implement pixel repeating in the image to fill empty pixels resulting from application of the depth adjustment algorithm. In a preferred embodiment, the pixel repeating is automatically implemented without user intervention.

"Real Time Depth Positioning"

This feature provides the ability to reposition objects with depth algorithms automatically repeating pixels in real time. According to the present invention, in the interest of speed, objects or sections of objects can be repositioned with any depth algorithm in real time while viewing the results in 3D in real time.

"Original Pixel Recovery"

This feature provides the ability to automatically undo, or restore all original pixel information that may be altered or removed by the object positioning with various depth algorithms for the purpose of undoing, or reversing a depth algorithm object position. In other words, if an object is moved or skewed, as example, in one direction, pixels on one side will be repeated and on the other side pixels will be covered up by the objects new position. If the object is moved back the other direction for any reason, it is necessary and desirable to recover the original pixels that were present rather than repeating the pixels across where actual pixel information used to exist.

Where pixels get repeated in one direction, and covered up by the other, the inverse function is also necessary. When depth algorithms are applied, objects may cover up pixels in the direction of the object movement. One of the key benefits to the present invention is the fact that objects have the ability to have their depth values applied plus or minus while the operator views the results in 3D in real time. This feature provides the user with the ability to automatically undo the repeated pixels when the reverse depth direction is applied. For example, if an object moves into the foreground, it has actually repositioned itself to the left in the new right view frame. When that object moved to the left, it covered up pixels to the left of that object. If that same object moves back, in the opposite direction, to the right, the pixels that were originally covered up need to be restored. According to the present invention, pixels that get covered up by depth algorithms are safely stored and never lost so they may be recovered when necessary.

An image processing method according to an embodiment of the present invention includes the step of: storing, and making available for recovery, pixel data for all previous steps in an image rendering process.

"Simultaneous Depth Algorithms"

This feature provides the ability to increase or decrease a multiple number of depth algorithms of multiple objects simultaneously in real time while being viewed in 3D.

There will be many situations where an operator applies more than one algorithm to many objects, and more than one algorithm to even one object. This feature allows the operator to adjust all, or a selected number of, algorithms at the same time. By way of example, this feature allows an operator to adjust the adjust the position or depth value of an object on the left side of the screen and, at the same time, adjust another.

An image processing system for converting two-dimensional images into three-dimensional images according to an embodiment of the present invention includes: an interactive user interface configured to allow a user of the system to select a plurality of defined objects in an image and to automatically and independently apply depth algorithms to each of the defined objects. In a preferred embodiment, the interactive user interface is configured to allow the user to apply a common depth algorithm (or different depth algorithms) to each of the defined objects.

"Multiple Depth Properties Applied Simultaneously"

This feature provides the ability to store and recall in user scratch pad memories depth algorithms with depth properties. FIG. 11G demonstrates a scene whereby multiple objects may be tagged (linked) together so that multiple depth properties can be applied simultaneously while viewing the results in real time. According to the present invention, Tagged Objects may follow the same algorithms frame by frame over time.

"Spiral Algorithm"

This feature provides the ability to apply a spiral depth algorithm to an object, or objects, creating a spiral effect, while viewing the depth of the object in real time while viewing the 3D end result effect.

Figure 21A:
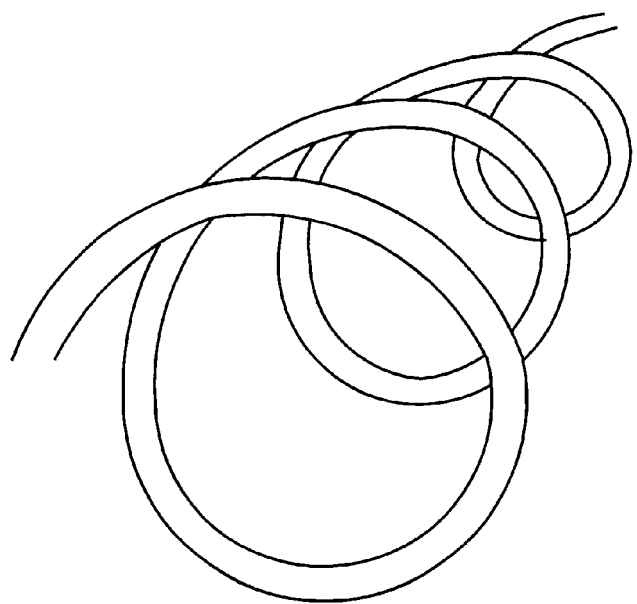
FIGS. 21A and 21B illustrate the "Spiral Algorithm" feature of the present invention.

There are some photographic scenarios in which an object may spiral its way from the foreground to the background, or vice versa. It is a tremendous advantage to be able to utilize an algorithm that takes this condition into account thereby dramatically speeding up the process of reconstructing its depth back into the original scene. FIG. 21A conceptually illustrates such a spiral shape as an algorithm, although the algorithm itself may be modified to conform to the content of the object or objects to be processed.

Figure 21B:
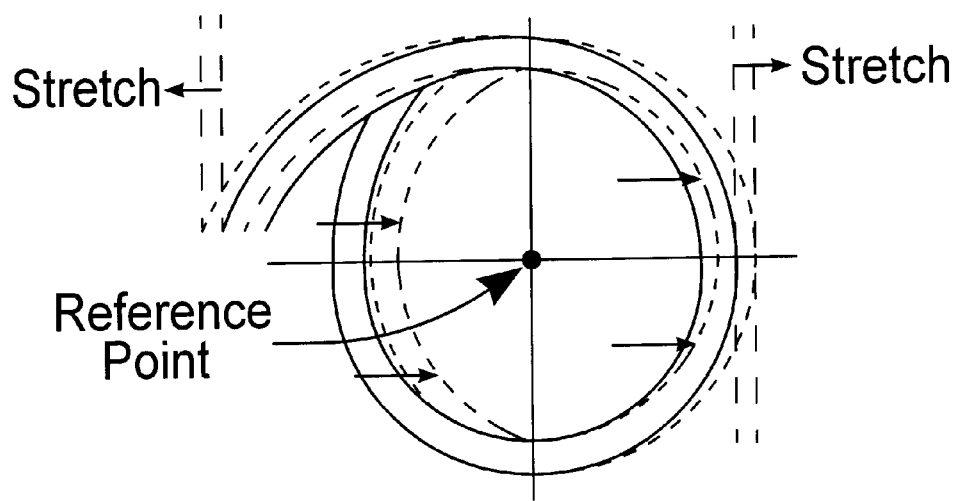
Figure 22A:
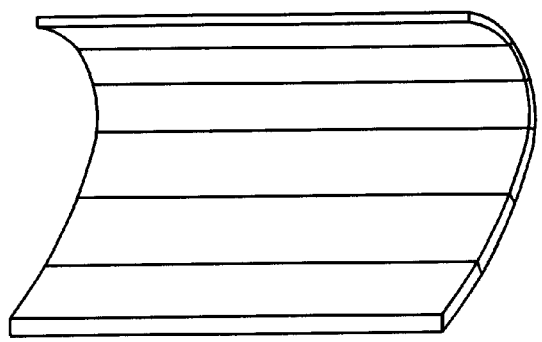
Figure 22B:
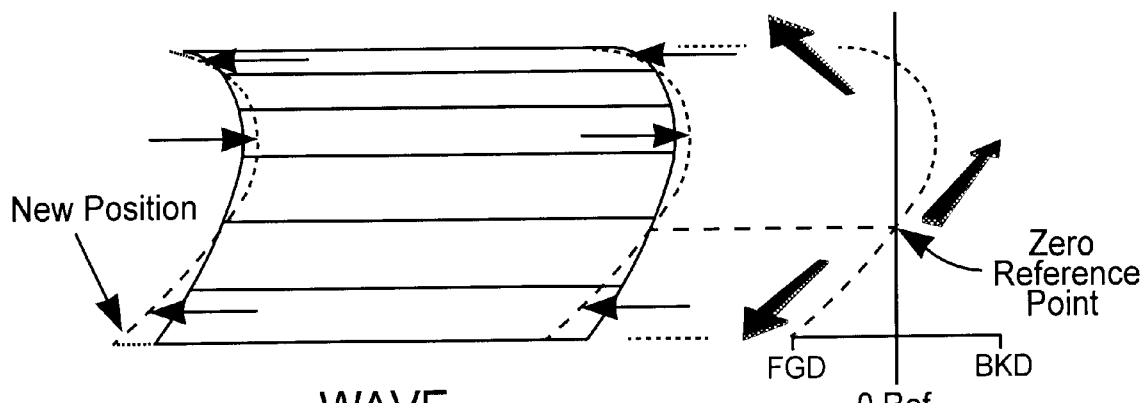
Figure 22C:
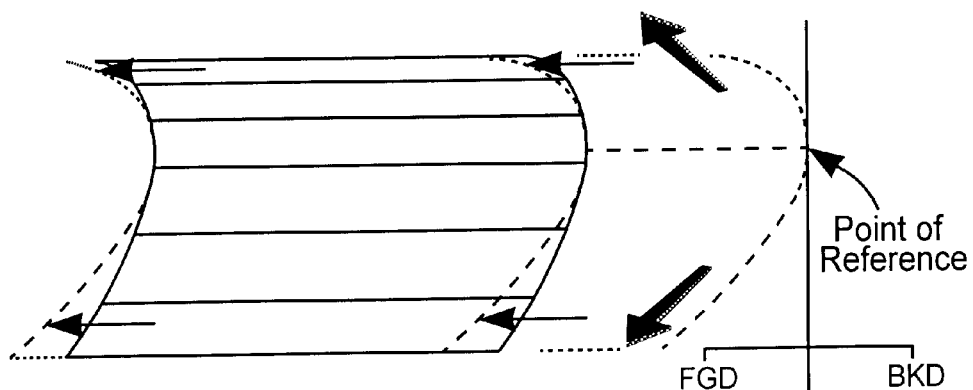

Applying a depth to a spiral shape in the form of an algorithm that adjusts itself automatically has a complexity in that it must always remain connected together. FIG. 21B conceptually illustrates the way in which the spiral algorithm would function. The spiral algorithm must essentially take into account the entire object shape and cross connection points. A cross connection point is where one arm, or leg, of the spiral crosses over another as it travels from the foreground to background or vice versa. A reference point can simply be selected by the operator marking a point within the picture, e.g., with the drawing tablet pen. The reference point is the point that the operator will then grab with the pen and bend into its new position. As the operator bends the reference point into a new position, the defined object will appropriately stretch itself as shown in FIG. 21B. A second reference point may also be selected to essentially govern or limit the position of the back end of the object as so desired by the operator. The enormous advantage to this operation is the speed in which this is done by the operator's ability to have continuous feedback of the depth reconstruction process by actually seeing the 3D results in real time as the adjustments are made.

An image processing method for converting two-dimensional images into three-dimensional images according to an embodiment of the present invention includes the step of: applying depth information associated with a spiral shape to a defined object in an image such that a perceived depth of the defined object spirals in a circular manner from foreground to background or vice versa.

"Custom Depth Algorithm Shaping"

This feature provides the ability to customize a depth algorithm curve. According to the present invention, the user of the Dimensionalization™ workstation 200 is provided with the ability to quickly mark a point, or points, within an object and cause a customized modification to that object. This feature is desirable because many objects are complex in that they just do not conform to a perfect (or standard) algorithm.

In a preferred embodiment, the user is provided with tools for easily and rapidly implementing this feature. For example, the processor/controller is configured to allow the user to use the pen tablet to mark two or more points and then cause a customized depth property to take place.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

I claim:

1. An image processing method for converting two-dimensional images into three-dimensional images, comprising the steps of:

defining and preserving in its entirety a virtual object in an image as if objects in front of the virtual object are not present in the image; and employing a depth adjustment algorithm to reposition pixels of the virtual object within the image not affecting the objects in front of the virtual object to create a three-dimensional image in which depth is perceivable by a viewer.

2. An image processing method for converting two-dimensional images into three-dimensional images, comprising the steps of:

applying a reference point to an image; and associating the reference point with a plurality of defined objects in the image such that when pixels of one of the defined objects are repositioned within the image to create a three-dimensional image in which depth is perceivable by a viewer, the plurality of defined objects remain connected together at the reference point.

3. An image processing method for converting two-dimensional images into three-dimensional images, comprising the steps of:

linking together a plurality of defined objects in an image; and linking together depth adjustment algorithms which are applied to the defined objects such that an adjustment to the depth adjustment algorithm applied to one of the defined objects automatically causes adjustments to be made to the depth adjustment algorithms applied to the other defined object(s) to create a three-dimensional image in which depth is perceivable by a viewer.

4. An image processing system, comprising:

an interactive user interface providing an object sizing tool and configured to allow a user of the system to variably increase and/or decrease a size of a drawn object boundary within an image and to view changes to the drawn object boundary;

wherein the size of the drawn object boundary is increased or decreased by a uniform number of pixels away from its original boundary;

wherein the interactive user interface is configured to allow the user to convert two-dimensional images into three-dimensional images.

5. The image processing system of claim 4, wherein the interactive user interface is configured to allow the user to view changes to the drawn object boundary in real time.

6. The image processing system of claim 4, wherein the drawn boundary object is computer generated employing an object recognition technique.

7. The image processing system of claim 4, wherein the size of the drawn object boundary is proportionally increased or decreased.

8. An image processing system for converting two-dimensional images into three-dimensional images, comprising:
an interactive user interface configured to allow a user of the system
to select a portion of a defined object in an image to which a depth adjustment algorithm is being applied,
to employ one or more user input mechanisms of the system to stretch the selected portion of the defined object, and
to view a three-dimensional image which changes as the defined object is modified.

9. An image processing system for converting two-dimensional images into three-dimensional images, comprising:
an interactive user interface configured to allow a user of the system
to draw a variable width line on an image and to associate information with an area of pixels contained within the variable width line and
to change the variable width line while viewing an image which changes depending upon changes made to the variable width line.

10. The image processing system of claim 9, wherein the interactive user interface is configured to allow the user to convert two-dimensional images into three-dimensional images, and the information comprises depth information.

11. The image processing system of claim 10, wherein the depth information changes value across the variable width line.

12. The image processing system of claim 11, wherein the depth value transitions from an outside boundary of the variable width line to an inside boundary of the variable width line.

13. The image processing system of claim 9, wherein the interactive user interface is configured to allow the user to color correct images, and the information comprises color correction information.

14. An image processing method for converting two-dimensional images into three-dimensional images, comprising the step of:
providing an interactive user interface configured to allow a user to initiate and control a presentation of a magnified portion of an image inside a sub-window within the image while drawing outlines of objects in the image.

15. An image processing method for converting two-dimensional images into three-dimensional images, comprising the step of:
adjusting a symmetry and/or squaring parameter of a depth algorithm that is applied to an object in one of a stereoscopic pair of images for a three-dimensional image while viewing results of applied changes to the three-dimensional image.

16. An image processing method for converting two-dimensional images into three-dimensional images, comprising the steps of:
employing a depth adjustment algorithm to reposition pixels of a defined object within an image; and
restoring retained pixel information to pixels which the information was previously associated with and which have become empty pixels resulting from application of the depth adjustment algorithm.

17. An image processing method for converting two-dimensional images into three-dimensional images, comprising the step of:
applying depth information associated with a spiral shape to a defined object in an image such that a perceived depth of the defined object spirals in a circular manner from foreground to background or vice versa.

18. A memory device comprising:
an article of data storage media upon which is stored images, information or data created employing an image processing method for converting two-dimensional images into three-dimensional images including the steps of
defining and preserving in its entirety a virtual object in an image as if objects in front of the virtual object are not present in the image, and
employing a depth adjustment algorithm to reposition pixels of the virtual object within the image not affecting the objects in front of the virtual object to create a three-dimensional image in which depth is perceivable by a viewer.

19. A method for providing a three-dimensional image, comprising the steps of:
receiving or accessing data created employing an image processing method for converting two-dimensional images into three-dimensional images including the steps of
defining and preserving in its entirety a virtual object in an image as if objects in front of the virtual object are not present in the image, and
employing a depth adjustment algorithm to reposition pixels of the virtual object within the image not affecting the objects in front of the virtual object to create a three-dimensional image in which depth is perceivable by a viewer; and
employing the data to reproduce a three-dimensional image.

20. A memory device comprising:
an article of data storage media upon which is stored images, information or data created employing an image processing method for converting two-dimensional images into three-dimensional images including the steps of
applying a reference point to an image, and
associating the reference point with a plurality of defined objects in the image such that when pixels of one of the defined objects are repositioned within the image to create a three-dimensional image in which depth is perceivable by a viewer, the plurality of defined objects remain connected together at the reference point.

21. A method for providing a three-dimensional image, comprising the steps of:
receiving or accessing data created employing an image processing method for converting two-dimensional images into three-dimensional images including the steps of
applying a reference point to an image, and
associating the reference point with a plurality of defined objects in the image such that when pixels of one of the defined objects are repositioned within the image to create a three-dimensional image in which depth is perceivable by a viewer, the plurality of defined objects remain connected together at the reference point; and employing the data to reproduce a three-dimensional image.

22. A memory device comprising:

an article of data storage media upon which is stored images, information or data created employing an image processing system for converting two-dimensional images into three-dimensional images including an interactive user interface configured to allow a user of the system
to select a portion of a defined object in an image to which a depth adjustment algorithm is being applied,
to employ one or more user input mechanisms of the system to stretch the selected portion of the defined object, and
to view a three-dimensional image which changes as the defined object is modified.

23. A method for providing a three-dimensional image, comprising the steps of:

receiving or accessing data created employing an image processing system for converting two-dimensional images into three-dimensional images including an interactive user interface configured to allow a user of the system
to select a portion of a defined object in an image to which a depth adjustment algorithm is being applied,
to employ one or more user input mechanisms of the system to stretch the selected portion of the defined object, and
to view a three-dimensional image which changes as the defined object is modified; and employing the data to reproduce a three-dimensional image.

24. A memory device comprising:

an article of data storage media upon which is stored images, information or data created employing an image processing method for converting two-dimensional images into three-dimensional images including the step of:
adjusting a symmetry and/or squaring parameter of a depth algorithm that is applied to an object in one of a stereoscopic pair of images for a three-dimensional image while viewing results of applied changes to the three-dimensional image.

25. A method for providing a three-dimensional image, comprising the steps of:

receiving or accessing data created employing an image processing method for converting two-dimensional images into three-dimensional images including the step of
adjusting a symmetry and/or squaring parameter of a depth algorithm that is applied to an object in one of a stereoscopic pair of images for a three-dimensional image while viewing results of applied changes to the three-dimensional image; and employing the data to reproduce a three-dimensional image.

26. A memory device comprising:

an article of data storage media upon which is stored images, information or data created employing an image processing method for converting two-dimensional images into three-dimensional images including the steps of
employing a depth adjustment algorithm to reposition pixels of a defined object within an image, and
restoring retained pixel information to pixels which the information was previously associated with and which have become empty pixels resulting from application of the depth adjustment algorithm.

27. A method for providing a three-dimensional image, comprising the steps of:

receiving or accessing data created employing an image processing method for converting two-dimensional images into three-dimensional images including the steps of
employing a depth adjustment algorithm to reposition pixels of a defined object within an image, and
restoring retained pixel information to pixels which the information was previously associated with and which have become empty pixels resulting from application of the depth adjustment algorithm; and employing the data to reproduce a three-dimensional image.

* * * * *